Sept. 11, 1962 D. A. RUDATIS 3,053,931

COLOR TELEVISION SYSTEM

Filed April 15, 1958 19 Sheets-Sheet 1

INVENTOR.
Domenico A. Rudatis
BY

INVENTOR.
Domenico A. Rudatis
BY

INVENTOR.
Domenico A. Rudatis
BY

INVENTOR.
Domenico A. Rudatis
BY

INVENTOR.
Domenico A. Rudatis
BY

INVENTOR.
Domenico A. Rudatis
BY

INVENTOR.
Domenico A. Rudatis
BY

INVENTOR.
Domenico A. Rudatis
BY

INVENTOR.
Domenico A. Rudatis
BY

INVENTOR.
Domenico A. Rudatis
BY

INVENTOR.
Domenico A. Rudatis
BY

Sept. 11, 1962 D. A. RUDATIS 3,053,931

COLOR TELEVISION SYSTEM

Filed April 15, 1958 19 Sheets-Sheet 12

INVENTOR.
BY Domenico A. Rudatis

INVENTOR.
Domenico A. Rudatis
BY

INVENTOR.
Domenico A. Rudatis
BY

Sept. 11, 1962 D. A. RUDATIS 3,053,931

COLOR TELEVISION SYSTEM

Filed April 15, 1958 19 Sheets-Sheet 15

INVENTOR.

Domenico A. Rudatis

BY

Sept. 11, 1962 D. A. RUDATIS 3,053,931

COLOR TELEVISION SYSTEM

Filed April 15, 1958 19 Sheets-Sheet 16

INVENTOR.

Domenico A. Rudatis

BY

Sept. 11, 1962 D. A. RUDATIS 3,053,931

COLOR TELEVISION SYSTEM

Filed April 15, 1958 19 Sheets-Sheet 17

INVENTOR.
Domenico A. Rudatis
BY

Sept. 11, 1962 D. A. RUDATIS 3,053,931

COLOR TELEVISION SYSTEM

Filed April 15, 1958

19 Sheets-Sheet 18

INVENTOR.
Domenico A. Rudatis
BY

INVENTOR.
Domenico A. Rudatis
BY 3,053,931
COLOR TELEVISION SYSTEM
Domenico A. Rudatis, New York, N.Y.
(134—21 Cherry Ave., Apt. 3C, Flushing 55, N.Y.)
Filed Apr. 15, 1958, Ser. No. 728,604
22 Claims. (Cl. 178—5.2)

The present invention is concerned with methods and devices to transmit and receive both stationary and moving television pictures, satisfactorily colored in conformity with the natural colors of the scenes to be televised, and in a wholly compatible form with the common black and white television transmission and reception.

It is known that in order to transmit and receive colored television pictures, certain systems have been already embodied wherein the quotes of three primary colors, forming the minimum necessary number for a sufficient reproduction of the natural colors, are transmitted either by a field sequence or by a line sequence or also by a sequence of small areas. All of these systems are based on the principle that in order to suitably reproduce the natural colors, and also the detail, it is necessary to have in each elemental area of the image, i.e. in each minimum resolvable element, the three quotes of the primary colors, multiplying thus by three the transmission exigencies.

When the field sequence is used, an extremely disturbing general flicker occurs which can not be avoided without using frequencies incompatible with those of the common black and white television. Other inconveniencies occur when the line sequence or the small areas sequencies are used, since by any arrangement and alternation of the three primary colors of the image, if the frequencies are the same as in the black and white television, the structures inherent to the single primary are excessively visible, and furthermore very disturbing crawl effects can occur. Due to these and other known inconveniencies, to which no remedy has been found up to now, all of the sequential systems have been abandoned, and in the U.S.A. a simultaneous transmission system has been substituted therefore, i.e. the N.T.S.C. system, wherein the high frequencies of the three primary colors are mixed into an achromatic signal, while the chromatic data are transmitted by a double modulation of a subcarrier in a form equivalent to a modulation of two subcarriers and interlacing the corresponding component frequencies with the component frequencies of the achromatic signal. Thus, however, a lot of complications is to be introduced both in the transmission and in the reception. The signals corresponding to the three primary colors are to be subjected to many elaborations, transformations, modulations and demodulations before being utilized in the color reproducing final process, and these operations demand for a far greater accuracy and a far greater number of means than the black and white television.

In order to exactly appreciate the present status of this technical development it is necessary to take into account some conclusive facts and results. First, when the N.T.S.C. system is used, most of the image details, which do not correspond to brightness variations, but only to hue and saturation variations are lost, and said details may have often an essential importance for the aesthetical appearance of the image. It is also to be noted that the aforsaid typical frequencies interlacing, also apart from all of the operational complications and difficulties inherent thereto, is technically correct only when the image is perfectly motionless. Furthermore several inconveniencies arise due to said two subcarriers. Lastly, the fundamental fact subsists that the complications, thus introduced, render difficult the registering, impractical the use and very expensive the production and maintenance with respect to the low aesthetical results commonly obtained, so that the commercial importance of such a color television system remained minimum in comparison to the well known importance of the black and white television, even if these two television forms are compatible under the electronic standpoint.

The present invention is concerned with methods and devices eliminating all of the aforesaid specific drawbacks of the color television systems heretofore embodied, both the drawbacks inherent to the sequential systems and those inherent to the simultaneous systems such as the aforesaid N.T.S.C. system.

Particularly, a fundamental object of this invention is that of providing novel methods and devices to transmit and receive both stationary and moving colored television pictures, suitably colored in conformity with the natural colors of the scenes to be televised, so that the production and maintenance cost of the receiving sets is minimized, and their use is safe and reliable, carrying thus color television almost at the economical and functional level of common black and white television.

Another important object of the present invention is that of providing color pictures without the drawbacks inherent to excessively visible or crawling structures disturbing the line or small areas sequential systems, keeping in the meantime the details corresponding to the sole hue and saturation differences which are missing, on the contrary, in the simultaneous systems such as the N.T.S.C. system.

A further object of this invention is that of rendering possible the transmission and reception of television pictures with satisfactory natural colors and with a suitable brightness, in a wholly compatible form with respect to the ordinary black and white system, without changing the transmission band, and causing the color receiving sets to be apt to normally operate also as black and white receiving sets, and the color transmissions may be normally received as black and white transmissions by the corresponding common receiving sets.

Many and other objects and advantages of the present invention reside in the elimination of one or more defects and complications encountered in the systems known up to now, and particularly in the elimination of complicated signal transformations, in the elimination of the subcarriers, in the elimination of difficult registrations and controls, and in the elimination of frequencies higher than those used in the black and white system, both for the color control and for any other functional need.

All of the aforesaid objects and advantages of the present invention, together with many other objects and advantages, will appear to the skilled persons, by the following description together with the attached drawings and the appended claims.

As an introduction, the invention can be briefly outlined pointing out that it is a new and useful combination of two complementary line-sequential tricolor processes which are alternated with the frame frequency of a black and white television system so that in the receiver screen two complementary colors are activated in each scanning line combining said two alternate line-sequential operations, in each field the three primary colors of a tricolor process being alternated by a conventional color commutation line-sequential operating and two consecutive fields being conventionally interlaced a fully compatible color television system is obtained by exclusive line sequential operations, whereby the basic defects of all known line sequential color systems are avoided because the color lines are statical and not crawling, and a bicolor process being effected in each line with the frame frequency a sufficient uniformity is always achieved.

All of the objects and advantages inherent to the present invention are embodied by original functional and structural features originally combined and practically incorporated into novel methods and devices for a color television system and the related modifications. Between the several original features of the present invention, the following ones may be considered as particularly important, such as to be apt to form a preliminary summary of the present invention in its general lines.

First, two groups of electronic signals representing two different groups of primary colors, each single group comprising three primary colors, necessary and sufficient to faithfully reproduce the hues of all of the natural colors, are sequentially utilized by interlaced fields having the same frequency and characteristics as in the common black and white television systems, without changing the extension of the transmission band, and, thus, in a way compatible therewith.

Specifically, in a preferred embodiment of the present invention, the sequential utilization of the signals is effected changing the primary colors only during the retrace periods in which no phosphor activation is to be effected, whereby all changes of color may be automatically synchronized with the common black and white scanning process. It is a very basic feature of the present invention that each one of these two tricolor processes is not only chromatically self-sufficient to reproduce any natural color including white but also formed by primary colors which are all opposite to the primary colors of the other tricolor process. It can be noted that opposite colors are those which occupy opposite positions in the known chromaticity diagram with reference to the position of white light, namely the illuminant or achromatic light, the opposite colors being also complementary if they are assumed in proper proportions so that their additive synthesis produces only white light (The Science of Color—Committee on Colorimetry of the Optical Society of America, 1953, page 368 and others). On account of the specific correlation between the two tricolor processes as used in the present invention, the three couples of opposite primary colors resulting from the two tricolor processes adequately combined operate as three bicolor processes each one of them approximately reproducing any natural color including white as an independent bicolor process. In fact, if the electronic signals inherent to one tricolor process are adequately proportioned to those of the other, the signals inherent to each couple of opposite primary colors represent the proper proportions of a bicolor process, that is, the additive synthesis of the proper proportions of the colored lights of two opposite primary colors becomes an approximate reproduction of the same color correctly and separately reproduced by each one of the two tricolor processes as used in the present invention. The less saturated are the colors to be reproduced, the better they are reproduced by each bicolor process, so that the approximation may be in many cases very satisfactory as the saturation of natural colors is commonly limited. Anyway, the three approximate bicolor reproductions automatically compensate each other on account of the fact that their additive synthesis constitutes the additive synthesis of the two tricolor reproductions, whereby as each tricolor reproduction is chromatically complete and self-sufficient necessarily their synthesis is correct, and, therefore, is equally correct also the synthesis of the three approximate bicolor reproductions. This manifold chromatic mechanism inherent to the present invention is technically based upon modern colorimetry corresponding at the present status of the art, whereby must be particularly avoided some common misconceptions, namely: the idea that the taking filters are a spectral division of the range of colors to be reproduced and the idea that the colors of said filters are the same as the primary colors, both ideas preventing a very fine color reproduction (Colorimetry in Television by William H. Cherry, Journal of the Society of Motion Picture Engineers, 1948, pages 613–642, and in particular page 636).

Consequently, it is to be understood that the two tricolor processes which are utilized in the present invention are both effecting a colorimetric reproduction, whereby they are chromatically complete and self-sufficient at the best of the art, their correct colorimetric arrangement being also the foundation of their interaction according to the present invention, the three bicolor processes being based upon said colorimetric arrangement.

The utilization of said two groups of signals which correspond to six primary colors is effected by means of some combinations of spatial and temporal interlacings hereinafter specified as preferred embodiments of the present invention. However, any persons competent in the art can recognize that the three bicolor processes imply different technical and electronical arrangements in conformity with the geometrical pattern of the areas to be activated on the receiving screen and with the transmission of the activating signals, always remaining in the frame of the present invention in which two chromatically complete and self-sufficient tricolor processes interact as three bicolor processes and such processes are all together utilized in the same arrangement. No matter how the transmission of the color signals is effected, in each minimum resolvable element of the final color picture, namely in each minimum area which may be resolved by means of a predetermined transmission band as in black and white television, at least two opposite primary colors are activated according to the present invention. More specifically, in each one of said minimum areas one of the three bicolor processes must be effected, the minimum vertical size of said areas corresponding to that of a scanning line and the minimum horizontal size of said areas corresponding to the extension of the transmission band identically as in common black and white television, so that the bicolor processes are effected in such a way to be always compatible with black and white television. In accordance with the basic principles of the present invention as already disclosed, the color reproduction in each minimum resolvable picture element is realized with the approximation inherent to the single bicolor process utilized in that picture element, but even if the bicolor reproduction may be defective no defects may be detected in single picture elements on account of the fact that the color discrimination in such small areas is very imited for any observers. On the other hand, the achromatic reproduction may be fully satisfactory inasmuch as from the additive synthesis of adequately proportioned opposite primary colors any achromatic range may be obtained in any minimum picture elements. Thus, as a general conclusion summarizing the manifold chromatic mechanism of the present invention, the three bicolor reproductions resulting from the interaction of the two chromatically self-sufficient tricolor processes are an approximate reproduction of natural colors and a satisfactory black and white reproduction in the minimum resolvable picture elements, and a better color and black and white reproduction in any areas a complete tricolor process is operating so as to effect the automatic compensation of the three bicolor reproductions. In this way, evidently, each of them is utilized as an approximate and partial color reproduction which may represent a complete black and white compatible reproduction and, consequently, also the necessary detail as in black and white television, in any minimum resolvable picture element corresponding to the extension of the transmission band. It goes without saying that the activation of two opposite primary colors in each of said picture elements may be performed using different color sequences in transmission as well as using different temporal and geometrical patterns in the utilization of the color signals on the receiving screen, whereby different embodiments of the present invention are obviously possible and they can be directly visualized by all persons having adequate technical ability in color television so that it is expedient to describe hereinafter only a few examples and some original details. In order to simplify the operations, the preferred embodiments of the present invention utilize the same bicolor process in all the minimum resolvable picture elements included in a scanning line, the three bicolor processes being uniformly alternated together with the succession of the line scanning. It is perfectly evident that the signals inherent to the two primary colors of a bicolor process utilized along any scanning line may be transmitted using a dot-sequential as well as a line-sequential color transmission. Both technics are already known in every detail, but the line-sequential color transmission, even if by far simpler, was necessarily eliminated as a commercial and compatible color television system on account of the fact that very distressing impressions of static, crawling or quivering patterns were visible in any cases (Television, by W. K. Zworykin and G. A. Morton, second edition, 1954, page 776) and that no means had been found to avoid the waste of bandwidth utilizing the low visual color discrimination in very small areas when the line-sequential was used (Fundamentals of Television Engineering, by G. M. Glasford, 1955, page 51). Inasmuch as by the chromatic mechanism of the present invention crawling or quivering patterns are avoided and the static patterns are not visible, and, moreover, the three bicolor processes, as already explained, utilize the low visual color discrimination in the minimum resolvable picture elements avoiding any waste of bandwidth, so it is possible to take advantage of the electronical simplicity of the line-sequential color transmission as an original combination in the present invention. Integrative explanations and technical details will progressively follow, but before all it must be pointed out that all line-sequential color television systems able to reproduce adequately the natural colors are obliged to scan each line with three primary colors as a basic operation, the combination in the present invention, on the contrary, implying the scanning of each line with only two primary colors. This difference is very fundamental for it represents an important gain in the bandwidth and a very effective utilization of the low color discrimination in minimum areas, results by no means attained in any of the line-sequential color television systems studied before this invention, in accordance with the above mentioned quotation of a best reference textbook. Combining the line-sequential transmission with the new chromatic mechanism in a new line-sequential color television system, along each scanning line only the signals inherent to only one primary color are transmitted and received, and during the consecutive scanning of the same line only the signals inherent to the opposite primary color are transmitted and received. Thus, along each scanning line two opposite primary colors automatically effecting a bicolor process are alternated with the frame frequency, whereby the colors are changed only during the blanking intervals and the color synchronization corresponds identically to the scanning process of the common black and white television. Therefore, no special signals are to be transmitted in order to control the color sequence, and no frequencies superior to those used in common black and white television are necessary for any controls and synchronizations. The transmission being effected by interlaced fields always identically as in common black and white television, two odd fields and two even fields are necessary to effect a bicolor process in each scanning line, so that in two frames all colors and details are completely obtained. At this point, it must be noted that no compatible color television system exists in which all colors and details are obtained in only one frame, all the compatible existing systems not only need two frames but also operate in much more complicated ways. Using the line-sequential transmission according to the present invention, the two frames integrate all details and also colors in all picture elements so as to satisfy completely detail and color discrimination, but full color reproduction is obtained also in any single frame, without flicker, with regard to large as well as sufficiently small areas. In fact, as during the scanning of each field only a single tricolor process is utilized, uniformly alternating the three primary colors inherent to the process itself, and as each field is necessarily interlaced with the immediately preceding field and with the immediately following field on account of the alternation of odd and even fields, two consecutive fields scanned with the two tricolor processes constitute a complete frame in which all natural colors including white are correctly reproduced with colorimetric fullness by each one of the two tricolor processes separately. A consecutive frame is always the same in regard to the color reproduction, so that no flicker is possible on account of the frame succession as such. Moreover, as in each scanning line only two primary colors are present, which realize a bicolor process approximately reproducing all natural colors including white, the primary color pattern is stationary but it is not visible on account of two facts, namely, the approximate reproduction effected by each bicolor process improves with less saturated colors, which are the most common natural colors, so that the various differences among the three bicolor reproductions remain generally below the visual color discrimination in the minimum picture elements, and the pattern of each primary color in each scanning line can be made so fine to avoid any visible geometrical pattern for this pattern is independent from the color transmission as well as from the bandwidth. Obviously, the color pattern being stationary, also crawling and quivering effects are eliminated. Hereinafter, demonstration will be given that also if only one primary color is present in the scene to be televised, and, therefore, the most difficult situation about the color pattern in the reproduction is met, on account of black areas on the receiving screen which correspond to inactivated colors, satisfactory results, however, can be attained operating in accordance with this invention. If an exceptionally saturated color is to be reproduced and it corresponds to a single primary color, in the transmission the opposite primary color is necessarily absent, but using a really colorimetric color reproduction if any primary color belonging to a tricolor process is to be reproduced by the other tricolor process two components corresponding to the colorimetric proper proportions of two other primary colors must result from the colorimetric analysis, because the primary colors of the first tricolor process are not primary colors in the second tricolor process, and at least two primary colors of the second tricolor process are necessary for reproducing by additive synthesis a primary color of the first tricolor process. This relation between the two tricolor processes is always valid even if it is reversed, whereby all three bicolor processes are always in operation no matter which color is to be televised, each bicolor process having at least a primary color more or less activated when a color is televised. In this way, a very basic result is attained, namely, in the cycle of two frames all scanning lines are activated, and consequently, no black lines corresponding to inactivated scanning lines may be seen in any color reproduction. Still considering the reproduction of a single primary color, in the cycle of two frames, on the receiving screen among the lines of said primary color two adjacent lines will be interposed, and these two lines by additive synthesis reproduce the primary color of the lines among which the couples of lines are interposed. As a matter of fact, the color pattern also in the reproduction of a single primary color becomes satisfactorily uniform, that is, conclusively, one bicolor process reproduces the primary color to be televised and the other two bicolor processes reproduce the same primary color operating together, so that the final effect to be normally seen is only one primary color having a fine and uniform pattern beyond the visual discrimination. Evidently, as far as concerns the chromatic mechanism until now described, it makes no difference if on the receiving screen the primary colors are superposed or juxtaposed, if a different color reproducer is used, and if the circuits on the receivers are changed. When the two opposite primary colors operating in each scanning line are activated by signals corresponding to a proper colorimetric analysis as already pointed out, they realize a bicolor process necessarily and exclusively on account of said colorimetric correlation in which are practically included chromatic components of the whole spectrum and not only the small sections of the two opposite primary colors. In such conditions, each bicolor process is an approximation with regard to the reproduction of the hues, but it is very effective and substantially satisfactory as a reproduction of both the color saturation degree and also the detail, at each elemental area, by such an opposition of the chromatic effects, totally apart from the additive mixing of the three primary colors, inherent to each group and concurrently utilized, while in all of the other systems, both the saturation and the detail are exclusively obtained by the additive synthesis of three primary colors, i.e. of an entire group of primary colors.

The formation of white, when operating according to the present invention, is carried out in a fundamentally different way from that of the known systems, inasmuch as it occurs by a plurality of additive syntheses which integrate with one another in the final vision of white. By combining the chromatic effects of each signal of the first group, with the corresponding opposite chromatic effects of the second group, three different chromatic oppositions are obtained, by each of which the formation of white is obtained, and furthermore, besides these three different additive syntheses, white is very correctly and completely formed by each one of the two tricolor processes, so that, as a whole, white is formed by five different and separate syntheses, which combine all together in the final right effect, the combination being always necessarily correct inasmuch as the three bicolor processes compensate each other even if they are not separately correct.

In order to integrate the summary of the present invention, a color television system will be hereinafter schematically disclosed, said system practically embodying the aforesaid functional and structural features.

First, by a conventional tricolor camera, are together obtained the signals corresponding to the proper proportions of the three primary colors, that is the components of the color in each elemental area representing the minimum surface element which may be resolved in the final picture according to the used frequency band as in the common black and white television system.

The so obtained signal triad is elaborated by known means so as to obtain a second triad of primary colors opposite to those of the first triad. In the transmission, such two triads of signals are selected by a triple electronic commutation which in each field utilizes only a triad of signals and in each line utilizes only the proper proportions of a primary color excluding the proper proportions of all of the other colors. The transmission thus occurs by a line sequence, but in each line subsequently operate, by the field alternation, only the signals inherent to two primary colors and precisely a determined primary color and the opposite primary color pertaining to the other triad of primary colors. Thus, while the known sequential systems work with three primary colors and request six fields to embody the formation of white and to obtain the detail, by the present invention it is possible to obtain a well colored picture by two sole fields, and by four fields it is possible to obtain a satisfactory picture under any standpoint i.e. as to the colors, to the white and to the details, without the defects of the sequential pictures.

As the signals are solely utilized as line sequence, both the operations and the essential transmitting and receiving devices are the same as in the common black and white television.

In the reception, another triple electronic commutation, like that operating in the transmission, operates so as to subdivide the groups of signals activating the colors corresponding to the single lines. The synchronism of these commutations, both in transmission and reception, is always automatically ensured in that said field and line commutations are always all connected to the common processes of electronic scanning associated to the common black and white television wherein the odd fields are interlaced with the even fields.

The means used for reproducing the colors must activate the colors in the corresponding lines, carrying out all of the already described interlacings. All of these operations may be embodied without difficulty by a cathode ray tube, with a suitable receiving screen and a mask, by causing each color to correspond to a given incidence direction of the electron beam, all of the six incidence directions corresponding to the six primary colors being automatically controlled by the line scanning process since in the scanning of each line a sole primary color operates.

According to the present invention, the second triad of primary colors may be structurally included in the color reproducing system using six different phosphors, but the second triad of primary colors may be also functionally embodied by obtaining each primary color of the second triad by the additive synthesis of two primary colors of the first triad. Therefore, any cathode-ray tube for the formation of television pictures with three primary colors, as well as any other equivalent system to reproduce the colors, may be utilized in combination with the other operational means and methods forming the features of the present invention, this combination being obtained by simple changes in the known electronic process.

Form also a part of the present invention, other special devices and details inherent to the color reproduction, with important practical advantages, particularly as to the simplicity and efficiency, with respect to the cathode-ray tubes for the formation of three color television pictures presently used, as it will be clear from the following specification.

The inventive ideas will be rendered more easily understood, and the novel methods and devices embodying these principles will be clearly disclosed by the following detailed specification, in connection with the attached drawings, showing some examples of practical embodiment.

Figure 10:
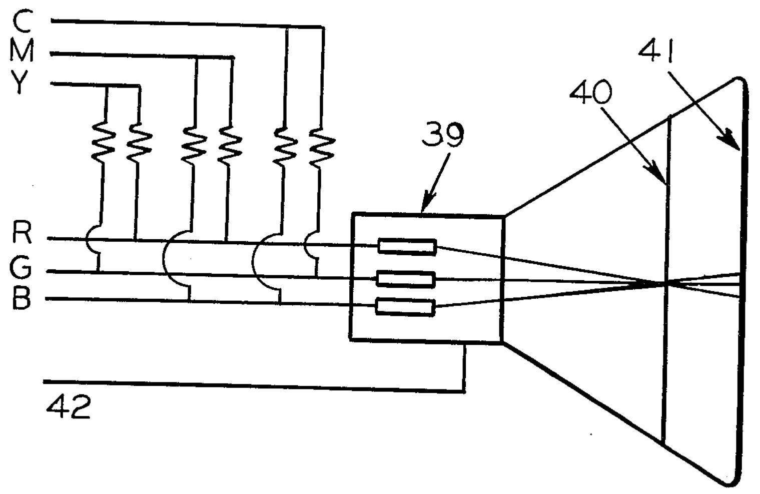
Figure 11:
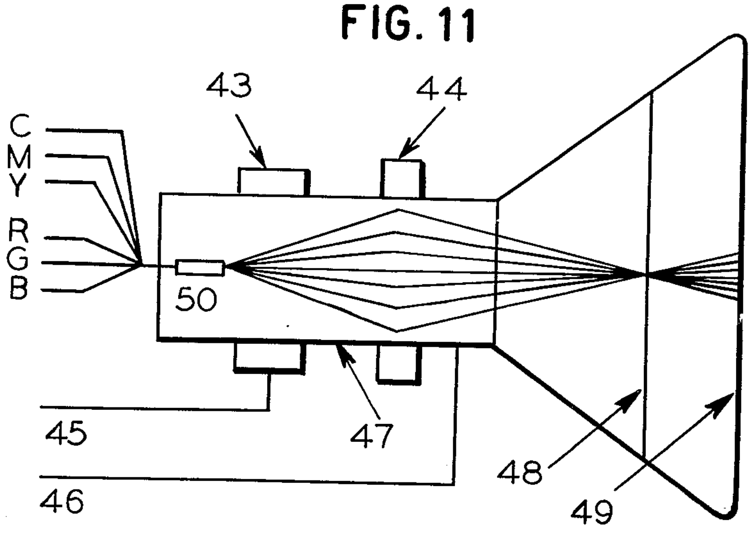
Figures 12, 13, 14:
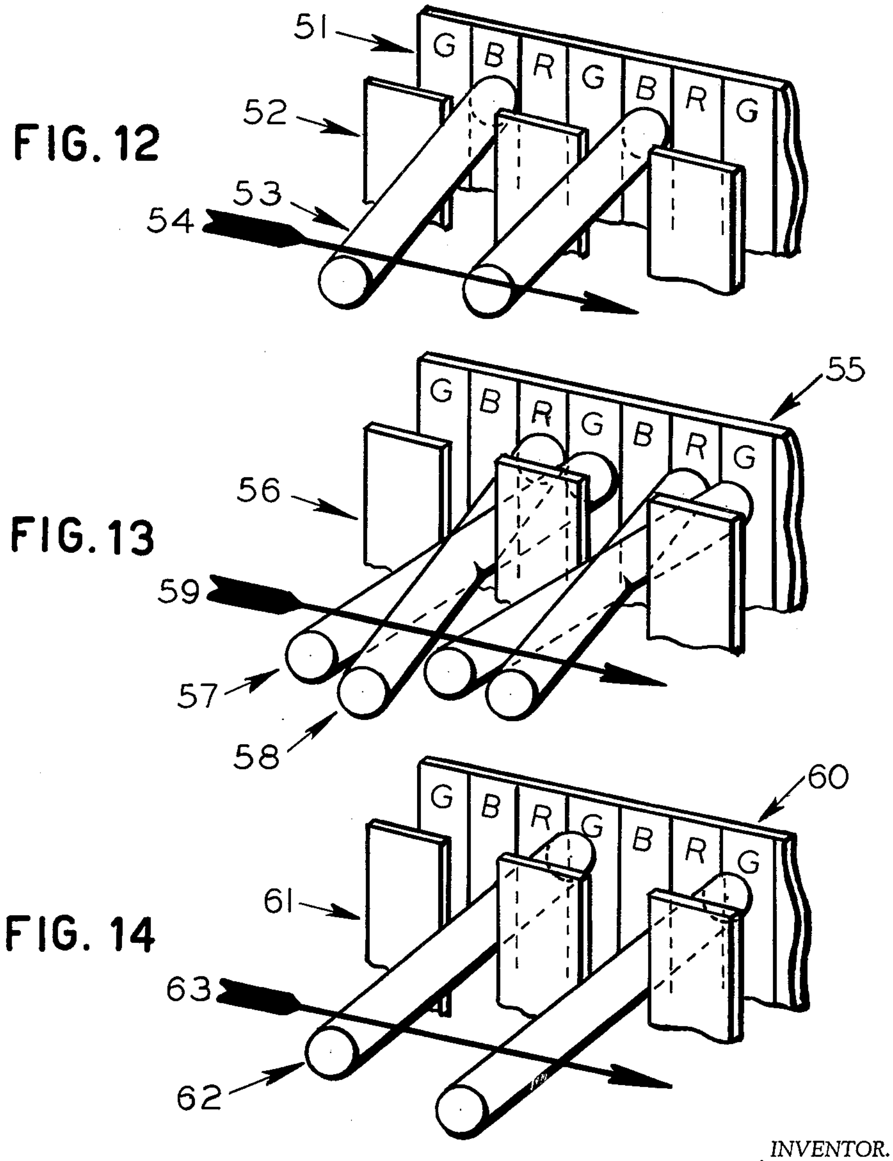
Figure 15:
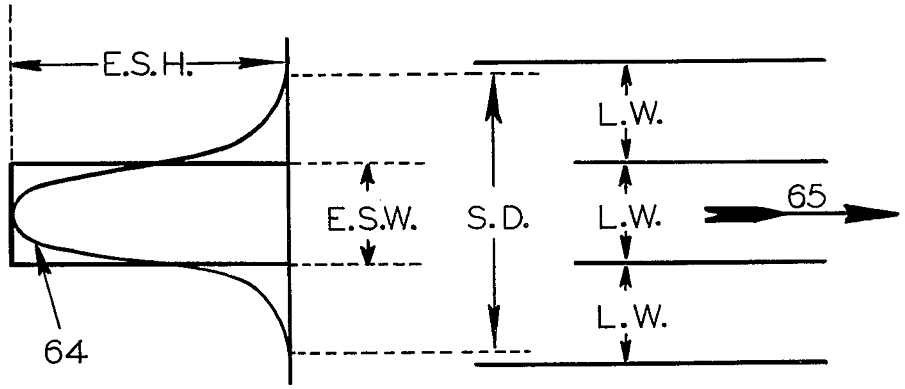
Figure 16:
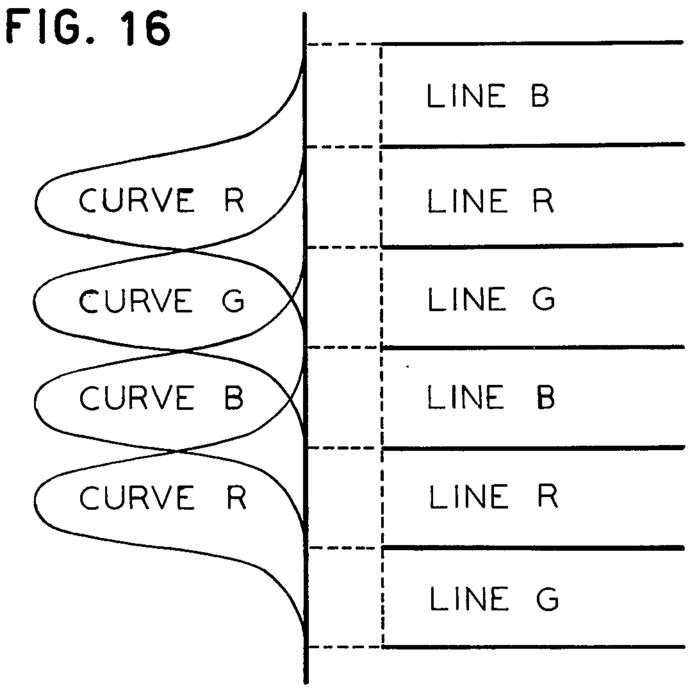
Figure 17:
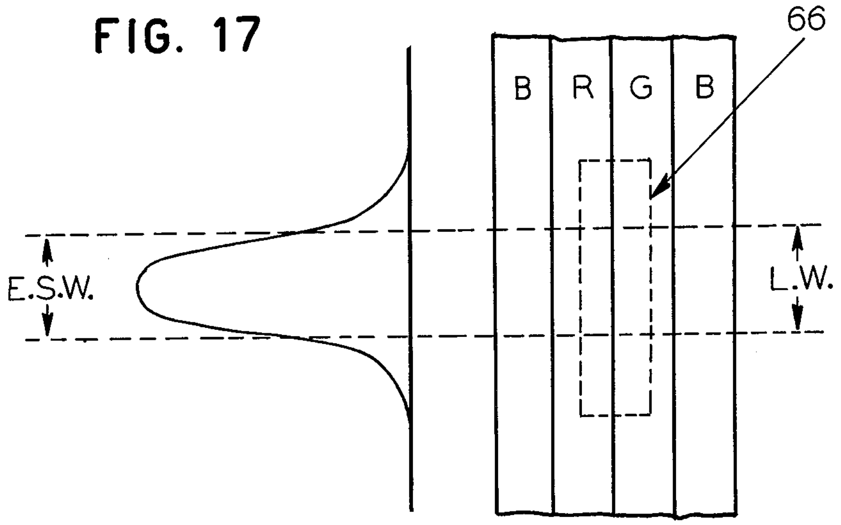
Figure 18:
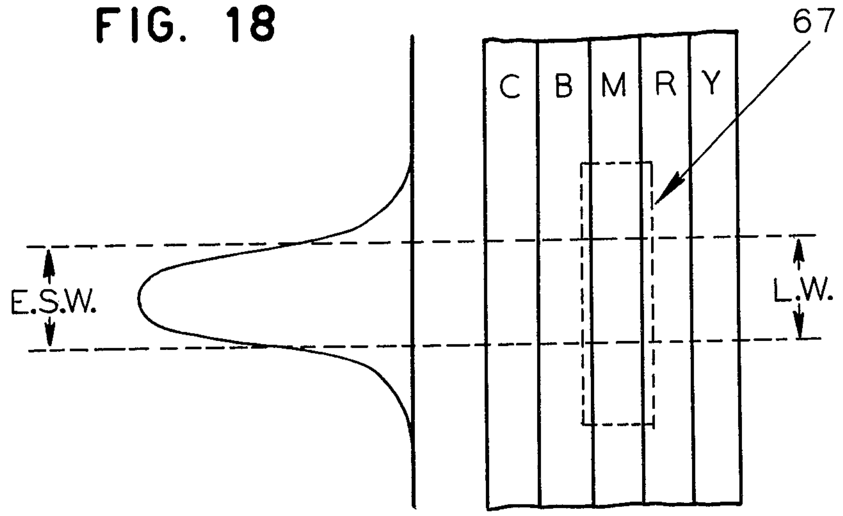

FIG. 10 schematically shows a color reproducing system with a cathode-ray tube provided with three electron guns, according to the present invention;

FIG. 11 schematically shows a color reproducing system by a cathode-ray tube wherein six primary colors are controlled by a single electron gun, according to the present invention;

FIG. 12 shows in detail the activation of a single primary color using a receiving screen with vertical stripes corresponding to the three primary colors of the first triad;

FIG. 13 shows in detail as, operating according to the present invention, one primary color of the second triad is obtained by the activation of two primary colors of the first triad carried out by two electron beams;

FIG. 14 shows in detail as, operating according to the present invention, one primary color of the second triad is obtained by the activation of two primary colors of the first triad carried out by a single electron beam;

FIG. 15 shows the energy distribution in the scanning spot in comparison with the width of the scanned line, working under conditions of maximum efficiency;

FIG. 16 shows the energy distribution in the scanning spot for each primary color of the first triad, in comparison with the width of the scanned lines, working under ideal conditions of maximum efficiency;

FIG. 17 shows the energy distribution in the scanning spot working under conditions of maximum efficiency and the corresponding activation of a primary color of the second triad, in conformity with FIG. 14, according to the present invention, whereby, changing the extent of the activated zone, both vertically and horizontally, no variation is introduced into the hue and the saturation of the activated color;

FIG. 18 shows the energy distribution in the scanning spot working under maximum efficiency conditions, and the corresponding activation of any primary color in a receiving screen with vertical lines inherent to the two triads of primary colors, according to the present invention, whereby, changing either vertically and horizontally the extent of the activated zone, no variation in the hue of the activated color is introduced, and the change of the saturation is minimized.

Figure 19:
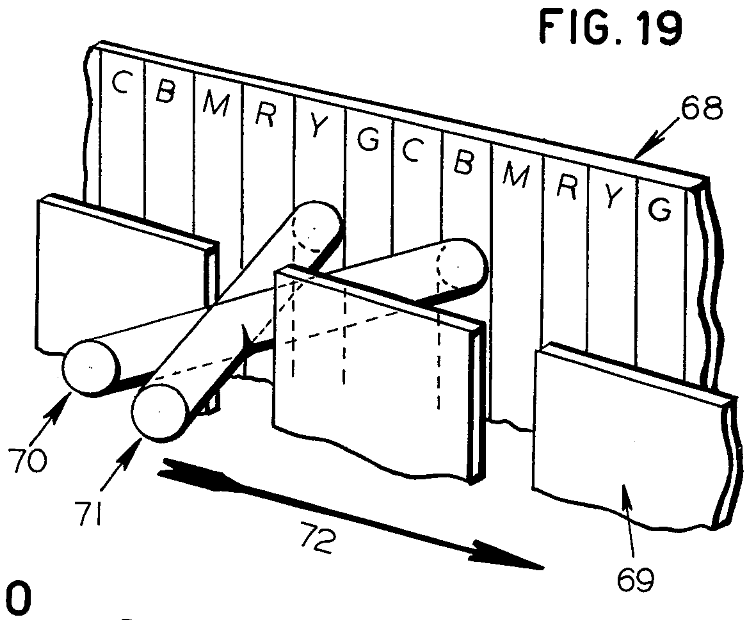
Figure 20:
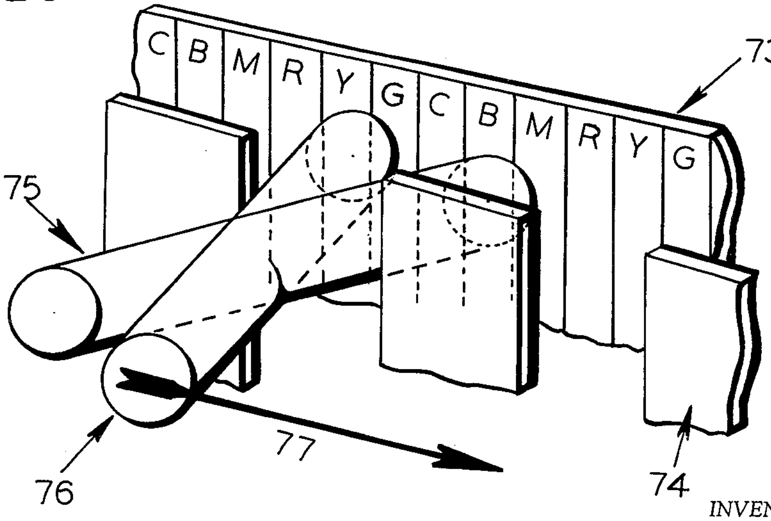
Figure 21:
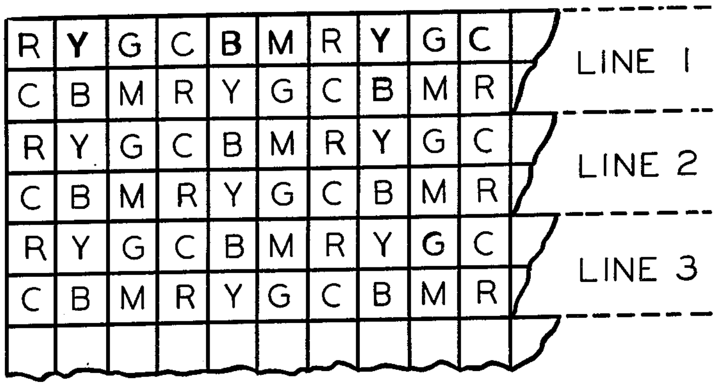
Figure 22:
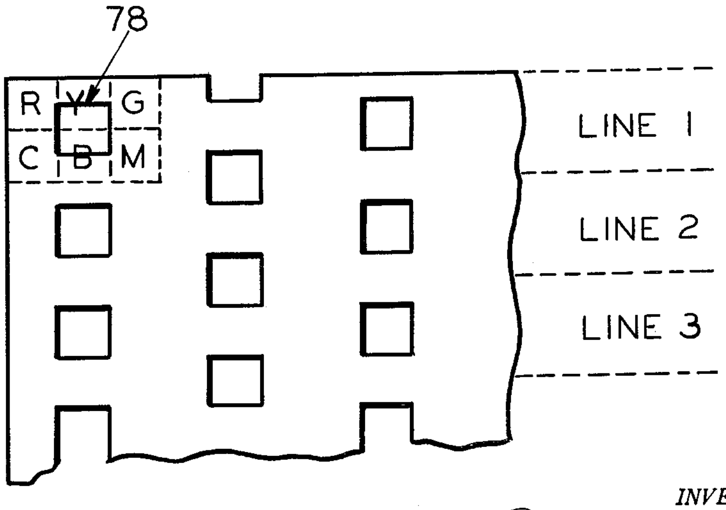
Figure 23:
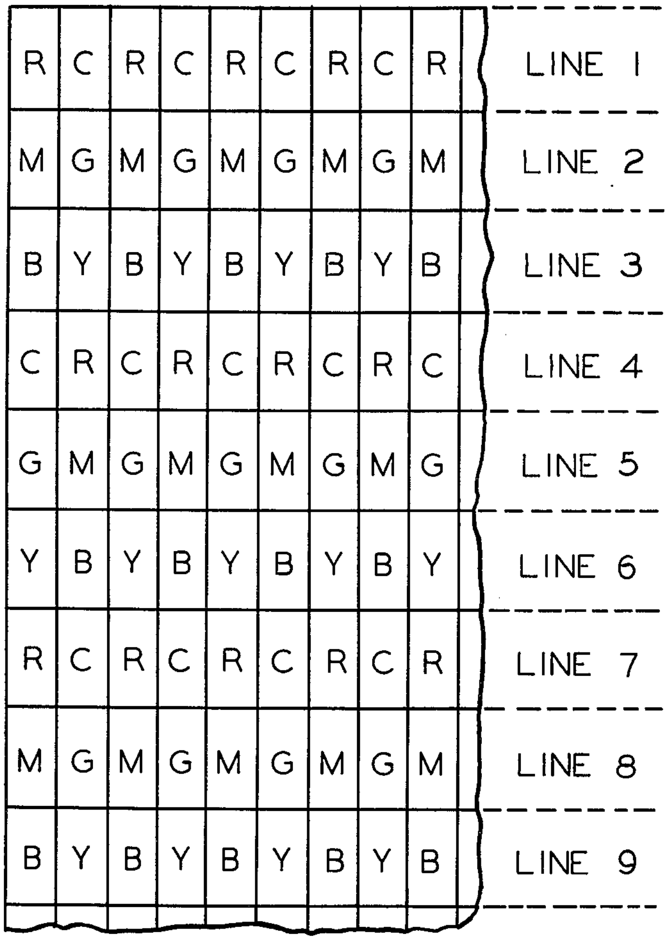
Figure 24:
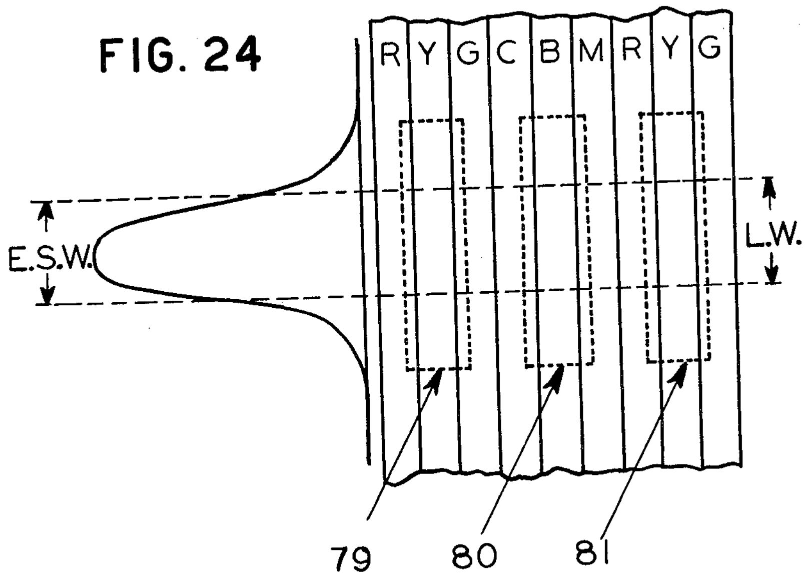
Figure 25:
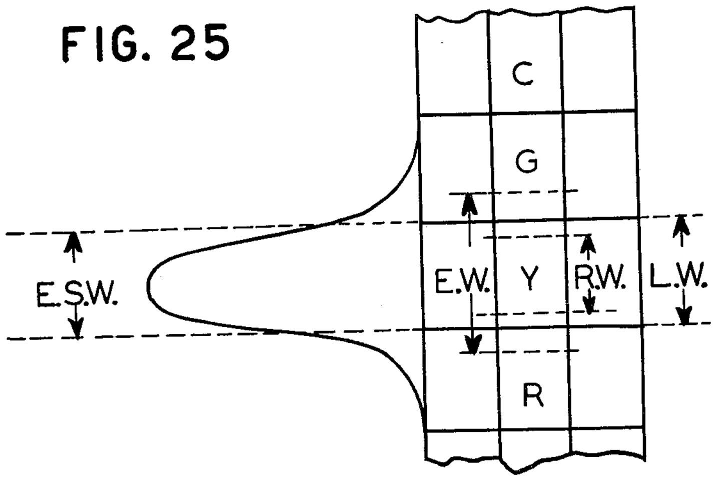
Figure 26:
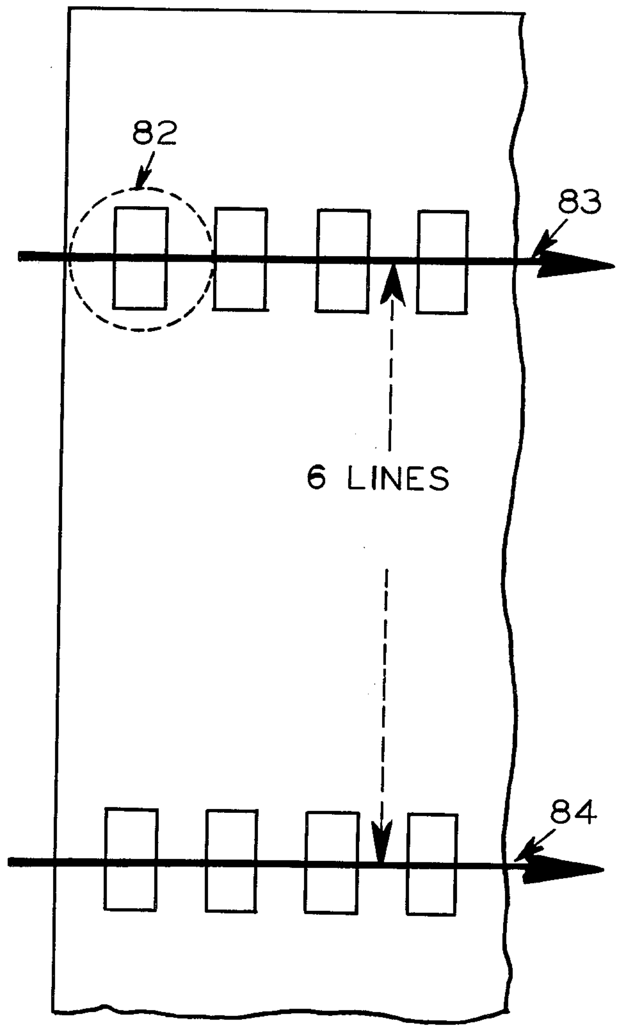
Figure 27:
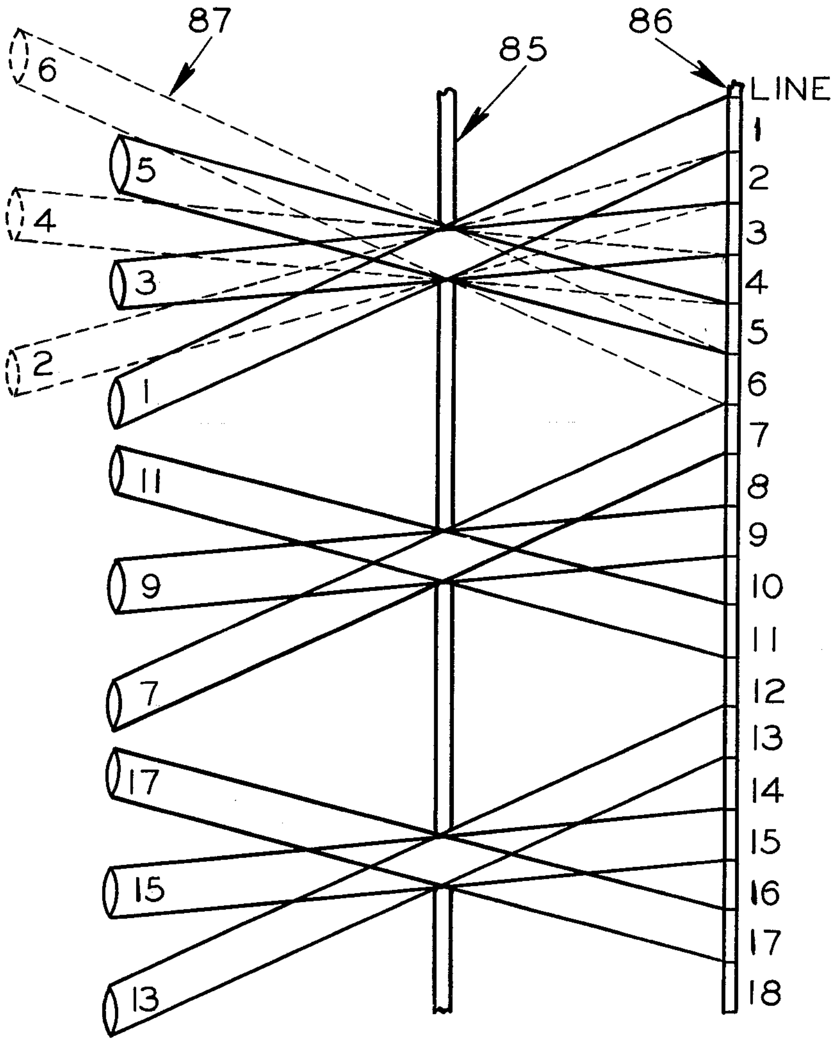
Figure 28:
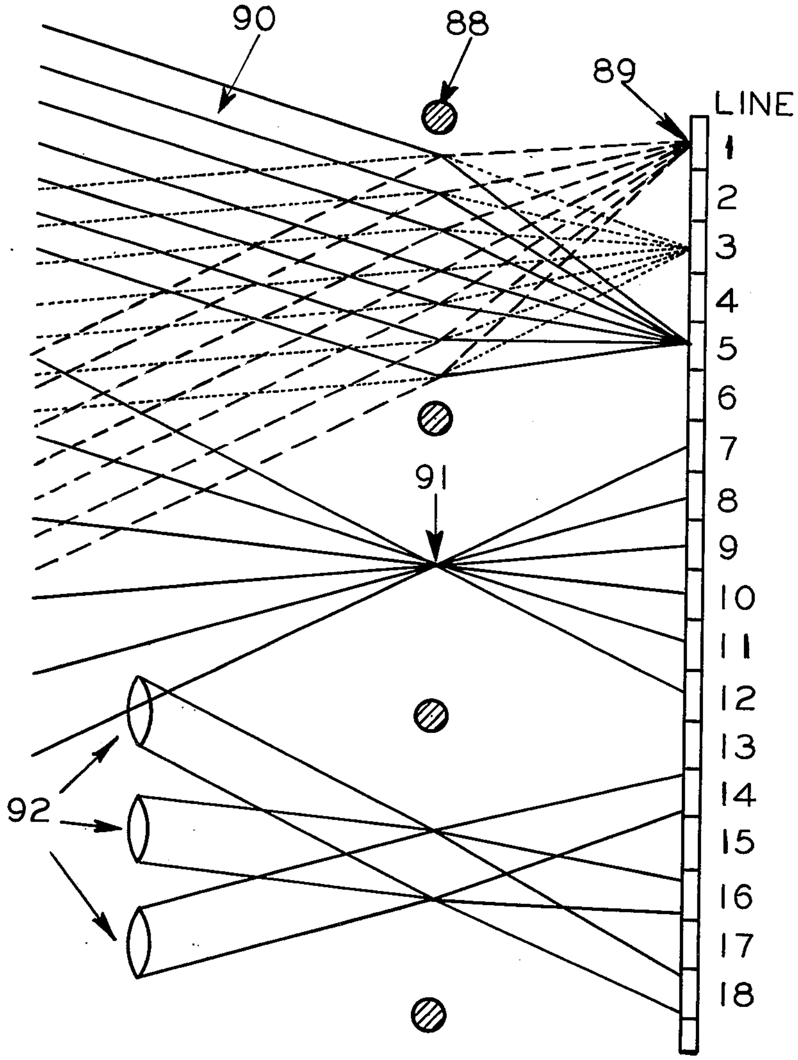
Figure 29:
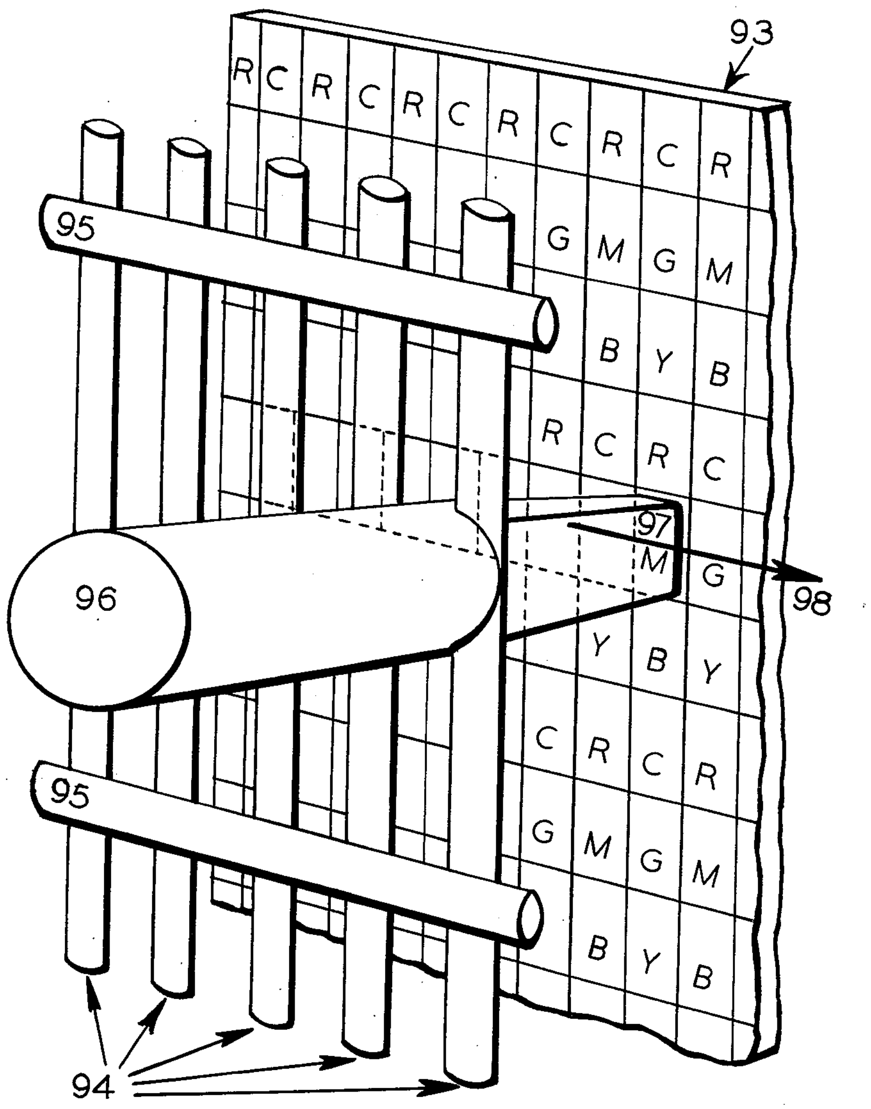
Figure 30:
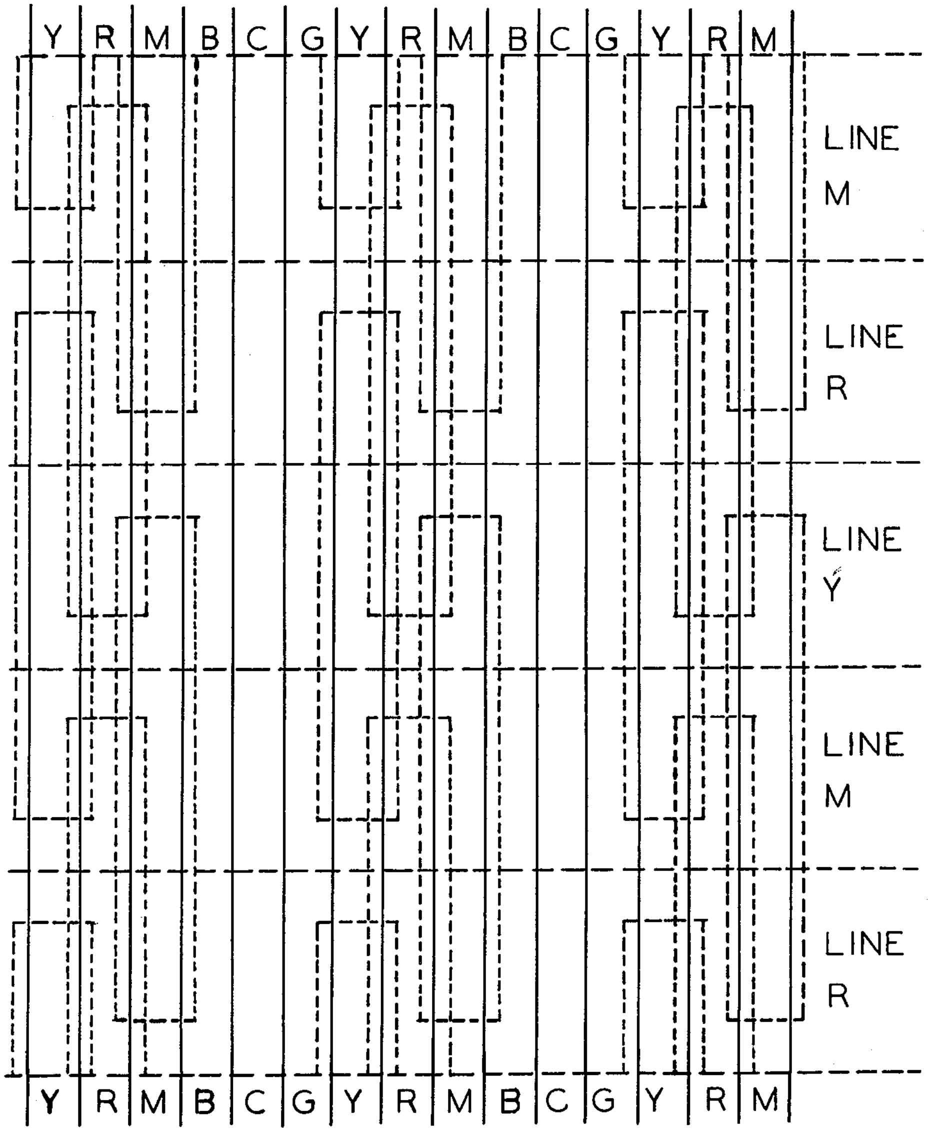

FIG. 19 shows in detail as, according to the present invention, using a receiving screen with vertical lines corresponding to said two triads of primary colors, when each horizontal line is scanned, the two opposite primary colors may be activated and also automatically interlaced by changing the direction of the electron beam;

FIG. 20 shows in detail as, according to the present invention, when working under the same conditions and with the same screen of the preceding figure, even if the dimensions of the scanning spot are increased, no variation of hue of the activated colors is introduced;

FIG. 21 shows in detail a special arrangement of the primary colors of both triads on the receiving screen, according to the present invention, whereby the picture structure is improved;

FIG. 22 shows in detail a special type of mask to be used in combination with the screen as disclosed in the preceding figure, according to the present invention, whereby the horizontal variations of the holes of the mask, do not modify the hues of the activated colors;

FIG. 23 shows in detail another special arrangement of the primary colors of both triads on the receiving screen, according to the present invention, whereby in each line are present only the two opposite primary colors which are to be activated on account of the position of the same line;

FIG. 24 shows the energy distribution in the scanning spot when working under maximum efficiency conditions, and the corresponding activation of two opposite primary colors lengthwise of one line, according to the present invention, in conformity with the FIGURES 18, 19 and 20, with a limited horizontal extension of the activated zone for each color and pointing out the proportion between the activated zones and the non-activated zones;

FIG. 25 shows the energy distribution in the scanning spot when working under maximum efficiency conditions and the advantages obtained in the activation of any primary color, when use is made of a receiving screen in conformity with FIG. 23;

FIG. 26 shows in detail another special type of mask, according to the present invention, to be used with the receiving screen shown at FIG. 23;

FIG. 27 schematically shows how work in cooperation, according to the present invention, the receiving screen shown at FIG. 23 and the mask shown at FIG. 26;

FIG. 28 schematically shows how the receiving screen shown at FIG. 23 is utilized in combination with a horizontal grid controlling the activation of the single lines, according to the present invention;

FIG. 29 shows in perspective detail view, the utilization of the receiving screen of FIG. 23, according to this invention, in combination with a horizontal grid controlling the activation of the single lines in conformity with the preceding figure and in combination with a vertical mask or grid controlling the interlacing of the opposite colors lengthwise of the single scanning horizontal lines; and FIG. 30 shows the representation of any primary color by said two triads of opposite primary colors, according to the present invention, when the receiving screen is activated in conformity with FIG. 18.

It is known that each color is defined by three variable elements and precisely: brightness, hue and saturation, which are inseparably connected to one another in the fundamental phenomenon of the color perception. In television, as in any other technical process for obtaining pictures in natural color, both the brightness and the saturation can be technically reproduced only in a very reduced proportion. However, this limitation does not constitute practically a bar, many tests having already shown that under the technical and aesthetical standpoint, in the color reproduction are mainly interesting the relative values of the brightness and the saturation rather than the absolute values. On the other hand, an essential importance is found in a correct reproduction of the hues, and for obtaining such a correct reproduction it is necessary to take account of the several relationships between said three variable elements, i.e. between brightness, hue and saturation. And this due to the fundamental fact that these variables, instead of being independent from one another, are interconnected, as shown by the known Helmholtz-Kohlrausch phenomenon. As these relationships are exclusively psycho-physiological processes which are submitted to no technical reproduction process, obviously must always be preferred those processes which respect to a greater extent the perceptive unity of brightness, hue and saturation, i.e. those processes which elaborate and separate at the lesser possible extent said three variables of the color. The experience has clearly demonstrated that by the sequential type systems it is possible to obtain television pictures with natural colors which are far more satisfying than those obtained by the simultaneous systems.

The embodiment of the simultaneous systems has been determined by the need of rendering color television compatible with black and white television, but these systems, rendering necessary the elaboration and re-elaboration of the chromatic data, and arbitrarily separating said three color variables, i.e. without taking into account the relationships between said variables, unavoidably introduce many errors in the color reproduction.

It is known that in the small areas, the brightness perception is far better than that of the hue and of the saturation. This fact has been used in the simultaneous systems, limiting the individuation of the colors to the low frequencies corresponding to relatively broad areas, and obtaining the detail, which is represented by the higher frequencies, only by brightness variations. Even the present invention utilizes this same fact of the low perception of the hue and of the saturation in the small areas, however, in a totally different and novel way allowing the drawbacks both of the simultaneous systems and the sequential systems to be eliminated.

Differently from the simultaneous systems wherein in a multiplicity of elemental areas the color is totally sacrificed and the detail is only embodied as black and white, by the present invention have been properly kept both the colors and the corresponding chromatic details since in each elemental area two opposite primary colors operate which mutually control both as saturation and hue, and integrate as detail. And differently from the sequential systems wherein in each elemental area color, white, and detail are necessarily defined by a transmission band three times more extended than that necessary for black and white television, by the present invention satisfactory results are obtained without such an extension of the transmission band as the opposite primary colors activate the same lines of the subsequent fields. Since in each line only two opposite primary colors are activated, only two scanning operations are necessary to form a complete cycle, the frequency of which results higher than that of the sequential systems, without necessarily requiring a simultaneous transmission of interlaced frequencies. Furthermore, as in each line the two opposite primary colors are temporally interlaced, and on the receiving screen said colors may be either superposed or juxtaposed, i.e. also spatially interlaced, obviously this double interlacing and therefore also the structure of the picture may be refined beyond the size of elemental areas, without changing the transmission frequency, i.e. in a wholly independent way from the transmission band. Thus, also the formation of white is independent from the dimension of the elemental areas, said dimension being defined by the transmission band identically to the usual black and white television system. By the same transmission band also the color uniformity is ensured.

An example of practical embodiment of the present invention, wherein are incorporated the aforesaid general inventive principles and other particular principles which will be specified hereinafter, is shown first at FIG. 1, as far as the transmission scheme is concerned and at FIG. 2, as far as the reception scheme is concerned, and said two schemes will be described in details hereafter.

Figure 1:
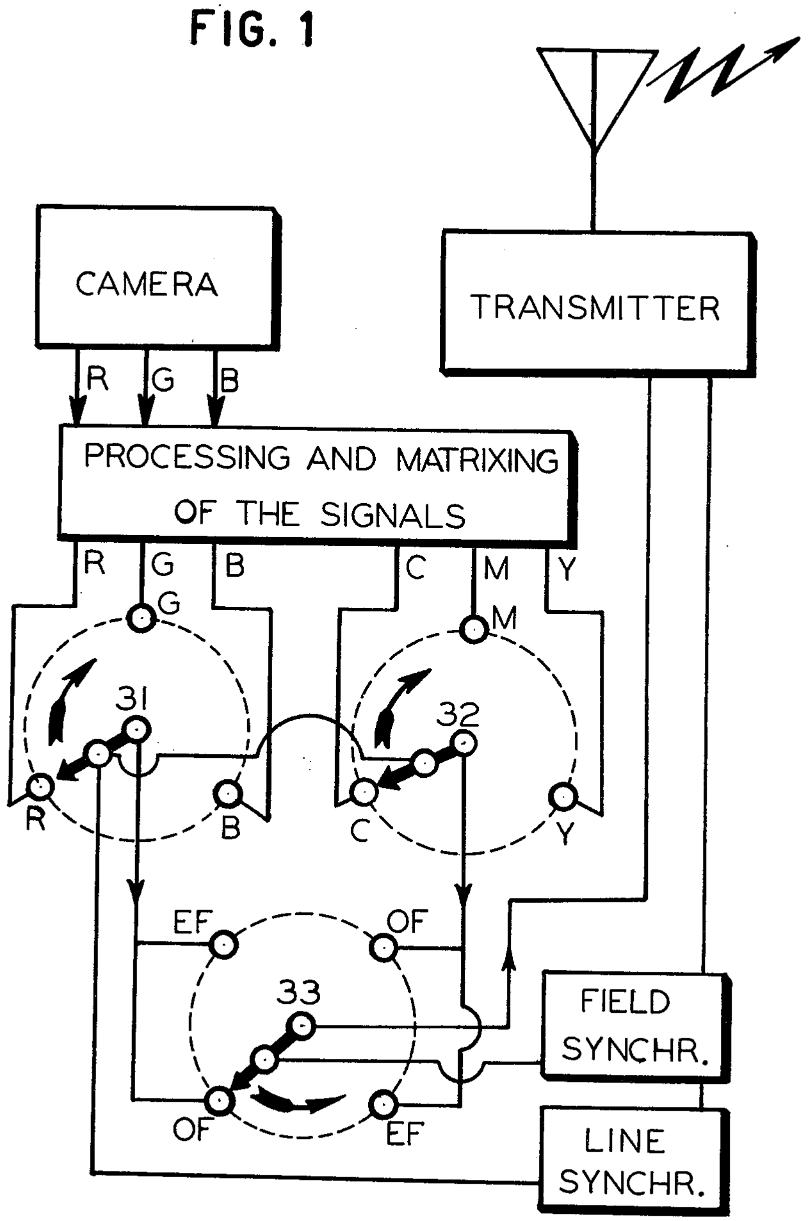
FIG. 1 shows a general diagram of the operations and of the devices to transmit compatible television pictures, with natural colors, either stationary or moving, according to the present invention, by the use of two triads of primary colors, the three primary colors of one triad being opposite to those of the other triad.

As shown at FIG. 1, by a shooting camera is first obtained an optical image of the colored picture to be televised, the colors of said picture are analyzed and transduced into electronic signals corresponding to the three primary colors inherent to the phosphors used in the terminal receiving device for the color reproduction.

In FIG. 1 these three signals are referred to by the characters R, G, B, which are related to the colors generally termed: red, green, blue, which together form the triad of primary colors commonly used in the color reproducing processes by additive synthesis, and therefore also in color television.

Color television shooting cameras operating with three camera tubes and delivering simultaneously the proper proportions of the three primary colors component the color of each area of the image, are presently well known and utilized, so that no further disclosure is deemed necessary.

Figure 4:
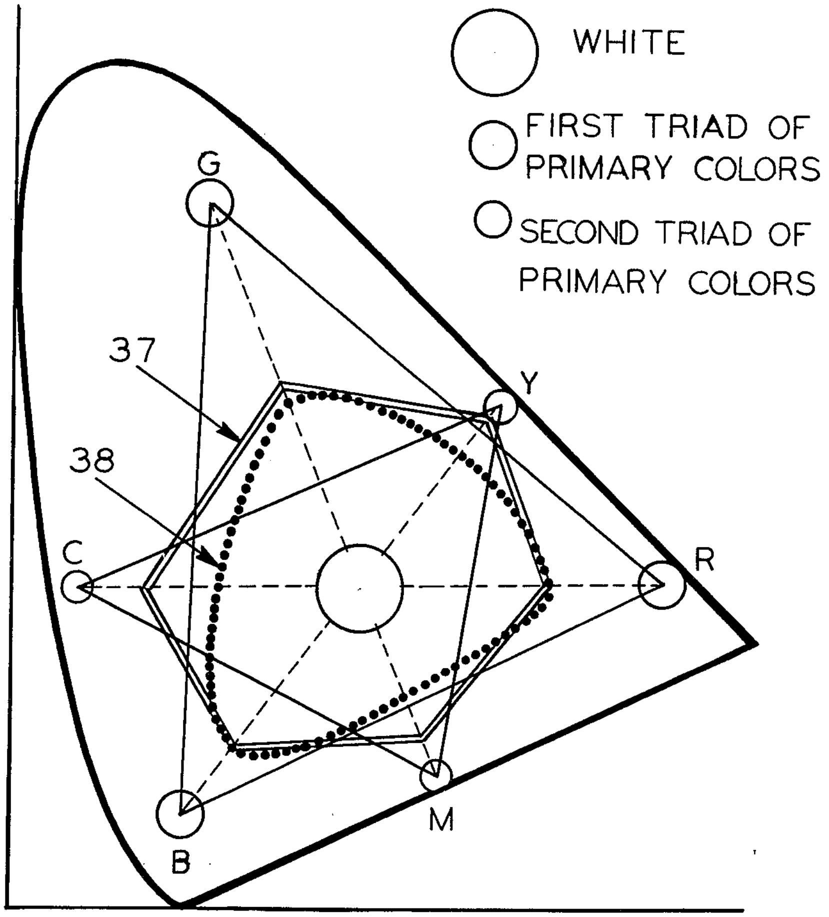
FIG. 4 shows, in comparison with the known diagram of the spectrum colors, the two triads of primary colors to which reference is made in the preceding figures, showing that the saturations which may be obtained by the present invention are greater than the saturations of the coloring matters commonly used.

The three so obtained signals are conventionally treated, with the eventual corrections and suitable preamplifications as required by the subsequent electronic commutations and transmission operations. At this level, as shown at FIG. 1, from the aforesaid triad of signals is obtained, by means of known electronic processes, a second triad of signals corresponding to another triad of primary colors, each of which is spectrally opposite to a primary color of the preceding triad. This second triad of signals is shown by the characters C, M, Y, showing the colors generally termed: cyan, magenta, yellow. The cyan being the opposite of the red color, the magenta being the opposite of the green color and the yellow being the opposite of the blue color. The relative position of these two triads of primary colors, related to the known curve of the spectral colors, is shown at FIG. 4.

The modern colorimetry has already demonstrated, that from the proper proportions of any color inherent to a given triad of primary colors, by a linear transformation are deduced the proper proportions of the same color in another triad of primary colors. The so-called electronic matrixes carrying out these transformations are perfectly known and used. In this particular case the transformation is a very simple one, due to the nature and relative position of two triads.

Inasmuch as from the regular tricolor cameras the three color signals are always obtained simultaneously, also from the matrix process, no matter how effected, all the color signals are delivered as simultaneous outputs. According to the preferred embodiment of the present invention by a line-sequential color transmission, during the scanning of each line only one color is transmitted and utilized, whereby all the other color signals corresponding to five primary colors are to be blanked out. Consequently, the general formation of the signal to be transmitted is perfectly the same as in common black and white television, with the same methods and processes of scanning and synchronization, the color signals included in each line being derived from a single output. The elimination of all the unutilized color signals before the formation of the signal to be transmitted is not at all a problem, for it is merely a switching process effected at the line frequency regularly supplied by the pulse generator. Practically, each color output of the matrix process is blanked out at a frequency which is a submultiple of the line frequency for during the transmission of each field three color outputs are alternately utilized, that is, during each scanning line only the circuit of one color output is in operation and, therefore, adding adequately extended blanking pulses, with the corresponding phase and controlled by the pulse generator, in each color output circuit realizes the aforesaid switching. It must be also pointed out that to change the primary color in accordance with the scanning process is already a perfectly known process on account of the fact that this process was conventionally utilized in many other line-sequential color television systems which worked adequately with regard to the color commutations, such systems having been discarded because of the distressing visual effects already mentioned and not because of any difficulty in the color commutation. As a matter of fact, the color commutations do not involve any new electronic problem or difficulty in the line-sequential systems, and the means to be used are not new and are not specific of the present invention. What is really specific of the present invention is the fact that the complete cycle of the color commutations is effected in only four fields instead of six fields used in the other systems, and that two chromatically self-sufficient tricolor processes are utilized instead of only one. The following description of the color commutations inherent to the present invention is, obviously, an inclusive demonstration of said commutations independently from what being already known as means and operations is not to be separately claimed and does not need any specific description.

As clearly shown at FIG. 1, the signals of the R, G, B, triad reach the electronic commutator 31 and the signals of the C, M, Y, triad reach an identical commutator 32. These two commutators operate perfectly parallel since both are exactly synchronized to the line scanning of the picture. Precisely, the R color is synchronized with the C color, the G color is synchronized with the M color, and the B color is synchronized with the Y color.

The commutator 33 excludes the simultaneous transmission of the two triads, and as it operates in perfect synchronism with the field sequence, it synchronizes the fields with said two triads, whereby after in the odd lines of a field, i.e. in an odd field, has operated the commutator 31 inherent to the triad R, G, B, in the even lines of the subsequent field, i.e. in the subsequent even field operates the commutator 32 inherent to the triad C, M, Y. Then in the subsequent odd field yet operates the commutator 32 and in the subsequent even field again operates the commutator 31. The entire cycle is identically repeated. In the commutator 33 the odd fields are shown by the reference characters OF, and the even fields are shown by the reference characters EF, and it is clear that the commutator 31 proceeds operating during an even field and an odd field, and also the commutator 32 operates in the same way. Therefore, while a complete commutation in the two commutators 31 and 32 implies the scanning of three lines, one complete commutation of the commutator 33 implies four fields to be scanned.

By such a combination of three commutators, into each field are transmitted only the signals corresponding to a sole triad of primary colors, while along each line are transmitted only the signals corresponding to a sole primary color, all of the other signals being excluded by the commutators. Thus, finally, the transmission is carried out by a line sequence, but this is not the case of a line sequential system, in its already known and specific meaning, as, according to the present invention, white, colors, and detail are obtained in a quite different and original way, by means of two triads of opposite primary colors, one pair of which is interlaced in each line. This fundamental difference and novelty with respect to all of the line sequential systems, is particularly remarkable in the receiving stage, as it will be hereinafter pointed out.

Figure 3:
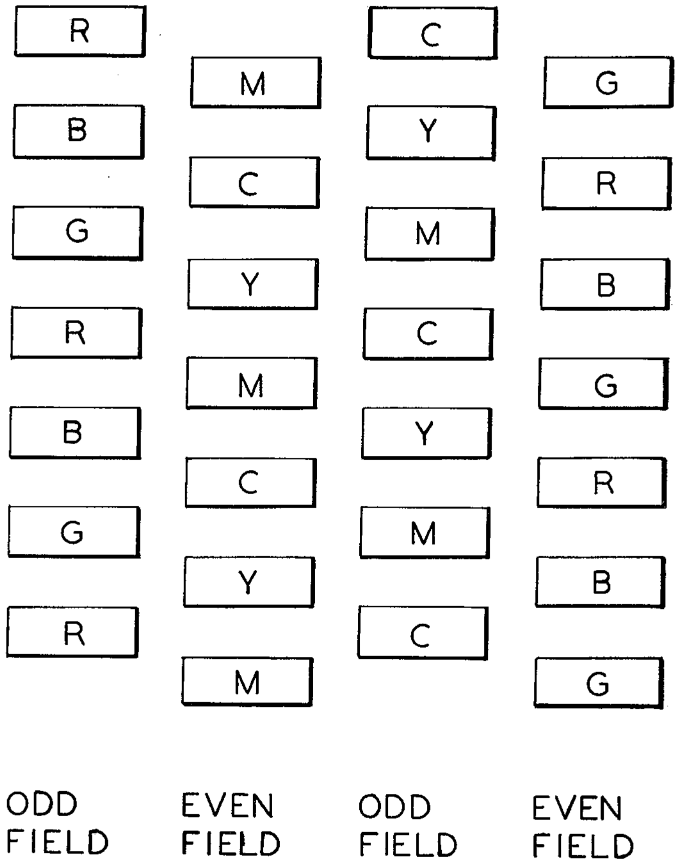
FIG. 3 shows the sequence of the colors in the lines of four interlaced fields, in conformity with the combination of the electronic commutations shown in the two preceding figures.

The final result of the transmission by the triple commutation according to the present invention is clearly shown in the sequence of four fields, diagrammatically shown, apart from the number and the proportion of the lines, at FIG 3, where each block represents one line of the picture, while the reference character inside each block indicates the color to which are related the signals transmitted in said line Likewise the common black and white television, each odd field is interlaced with an even field, and thus also the two primary color triads, corresponding to the transmitted signals, are interlaced. The four fields shown in FIG. 3 are exactly the four combinations shown at FIG. 1 for the commutator 33, said combinations resulting from the operation of each of said primary color triads one time in an even field and another time in an odd field, so that twice the triad R, G, B, is operative and twice the other triad C, M, Y, is operative.

In other words, FIG. 3, showing the sequence of four interlaced fields, diagrammatically illustrates, in the block columns from left hand towards the right hand, an odd field with the first triad of primary colors, then an even field with the second triad of primary colors, then an odd field with the second triad of primary colors, and lastly an even field with the first triad of primary colors.

Figure 2:
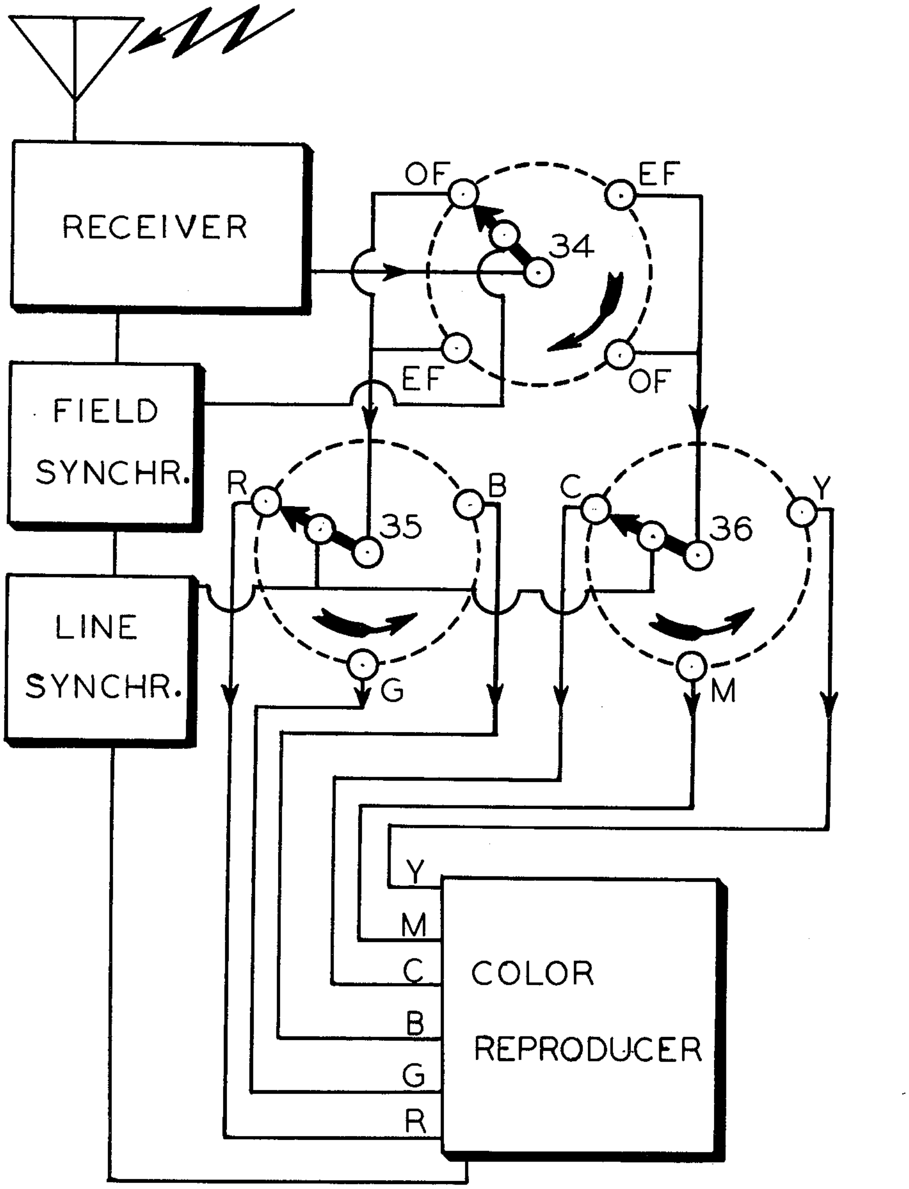
FIG. 2 shows a general diagram of the operations and of the devices to receive compatible television pictures, with natural colors, either stationary or moving, according to the present invention, by the use of two triads of primary colors, the three primary colors of one triad being opposite to those of the other triad.

As the signals transmitted in each line relate to a color which does not change during the transmission of said line, all of the essential devices for the transmission and the reception, and, therefore, the picture transmitter and the associated antenna shown at FIG. 1, as well as the television receiver, and its associated antenna, shown at FIG. 2, are those of the common black and white television, and no further specification is deemed necessary.

In the reception stage a triple commutation operates likewise that operating in the transmission, and precisely the commutator 34 of FIG. 2 alternates the fields like the commutator 33 of FIG. 1; the commutator 35 of FIG. 2 alternates the signals of the primary colors of the triad R, G, B, like the commutator 31 of the corresponding FIG. 1; and the commutator 36 of FIG. 2 alternates the signals of the primary colors of the C, M, Y, triad, like the commutator 32 of the corresponding FIG. 1. Therefore, the three commutations concerning the transmission and the three commutations concerning the reception are perfectly parallel operated, as shown at FIGS. 1 and 2, due to the evident equality of the schemes, provided with the same reference characters and letters for the commutations. All of these six commutations, being exactly synchronized with the field and line scanning of the common black and white television, can be controlled by the known devices controlling the scanning operation. Also all of the commutation devices, the commutation frequencies being comprised within the limits of the usual electronic art, request only for known means needing no particular description.

In particular, it is to be pointed out that all the frequencies of the color commutations are simple and immediate derivations from the pulse generator which is the key of all operations of the scanning and synchronizing process in common black and white television.

The color commutations described just now are a complete representation of what is specific of the present invention in comparison with the prior art, however, the prior art is not a technical limitation of the present invention. This fact must be specially considered with reference to the receivers, inasmuch as the same color commutations can be technically fulfilled in very different forms which depend upon the different forms of color activation used in the color reproducer. In any case, it is to be noted that all these different fulfillments are functionally included in the preceding description, the color sequence in the transmission being always the same line-sequential color transmission, and the utilization of said color sequence in the receiver, even if effected at different levels, that is, before the color reproducer or successively in the color reproducer or in combination, remains always substantially the same, as it starts from the same color sequence and commutates the colors effecting the same color separation. Some different realizations of the receiver are hereinafter demonstrated by successive example having also some specific characteristics concerning the commutations of the primary colors. For the expert in the art, it will be evident that the already described color commutations not only can be derived from the known line-sequential color television systems by means of the modifications herein specified, but also by means of other electronic arrangements. As an example, the two circuits inherent to each couple of opposite primary colors after matrixing and preliminary stages may be the input of a circuit alternately conducting in accordance with the frame frequency derived from the pulse generator timing all the transmission. In this way, the three couples of opposite primary colors imply three switching circuits having as outputs the signals corresponding to the same tricolor process. Then, the final color sequence to be transmitted is obtained switching the signals according to the line frequency in each field. Shortly, the color commutations may be effected also changing their order, as the same final result in transmission is obviously attained, and also other modifications may be obvious to the skilled persons, so that the present specification can be deemed sufficient.

As shown at FIG. 2, when the fields have been separated by the commutator 34 and when the lines associated to the different primary colors have been separated by the two commutators 35 and 36, the signals of the two triads, R, G, B, and C, M, Y, respectively reach separately the group of the terminal devices inherent to the color reproducer, forming thus a special line sequence.

The same result may also be obtained through some evident characteristic variations of the aforedescribed operations.

The aforesaid signals: R, G, B, could also be simultaneously transmitted, then at the receiving stage, the C, M, Y, signals would have to be deduced and lastly by the already specified commutation methods, the six different signal kinds would have to be supplied to the color reproducer. However, obviously such an operational way would imply the several complications and drawbacks of the simultaneous transmissions, which are totally avoided when operating as shown at FIGURES 1 and 2.

A minor change keeping all of the advantages of the previously described sequential transmission consists in obtaining directly in the shooting camera the two signal triads instead of deducing the second triad from the first one by a subsequent transformation, however this change requests for remarkable and multiple complications of the shooting camera. Therefore, the operation mode as described in detail remains the practically preferable mode.

When the signals corresponding to the six primary colors have severally reached the color reproducer, in the special sequence of lines and fields in conformity with the present invention, as diagrammatically shown at FIG. 3, the final picture may be obtained by different modes and by different means which, however, are obviously comprised into the present invention as all of them are novel combinations essentially operating with the specified methods. Some types of color reproducers, providing novel and suitable operational and structural features, will be described in detail hereinafter.

Considering the field diagram of FIG. 3, it may be seen that two subsequent interlaced fields form a complete image as line number, and relatively complete also as colors and detail, said image being a line sequential picture, however, where the lines in the representation of a single primary color would be excessively visible, by any triad of primary colors the image should be produced. On the contrary, if a picture is generated by two interlaced fields of FIG. 3, and another picture is generated by the other two fields, and then the so obtained two pictures are superposed, a very advantageous and totally novel result is obtained in that not only the colors and the detail are integrated, but also a satisfactory uniformity is embodied in the representation of the single primary colors. In fact, the activation of any primary color of either of the triads implies the activation of two primary colors of the other triad, which exactly reproduce by additive synthesis the activated primary. Such a reproduction is always exact as hue, and the possible saturation differences become negligible due to the line contiguity, as the two lines, the additive synthesis of which reproduces the same hue of the activated primary, occupy all of the space interposed between the lines of the activated primary. As this occurs for each primary color of both triads, a uniform structure is obtained for the representation of the single primary colors even if saturated, and the uniformity of the structure is more and more improved if the colors are, on the contrary, desaturated or compounded.

If, instead of optically superposing the two aforesaid pictures, in conformity with the present invention, the two opposite primary colors corresponding to the two pictures are juxtaposed in each line in form of sub-elemental areas, i.e. by spatially interlacing, besides time interlacing said pictures, other novel and advantageous results are embodied forming further and original developments of the previously disclosed inventive principles. In fact, all of the complications inherent to the formation of two separated pictures and to their optical superposition are avoided, and although working by a sole cathode-ray tube, directly seen, many other complications are avoided since the tube works through a simple sequence of lines, and in the meantime are avoided all of the serious inconveniences of the known systems wherein the picture is obtained by any line sequence in the three primary colors.

Figure 5:
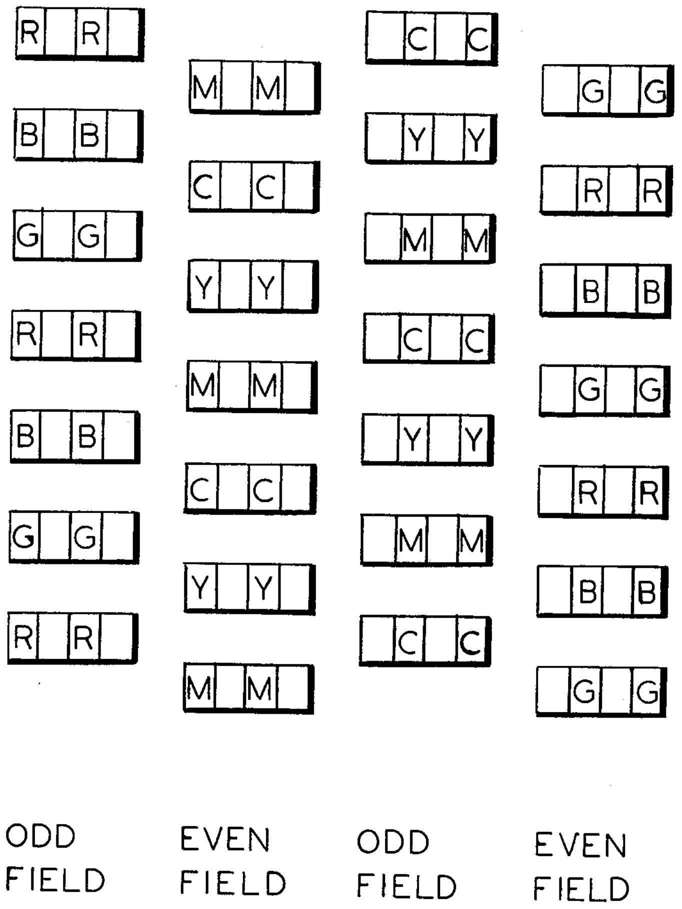
FIG. 5 shows as the sequence of four interlaced fields shown at FIG. 3 is embodied on the receiving screen by interlacing the opposite primary colors in each line.

This double temporal and spatial interlacing is evidenced in FIG. 5 wherein are diagrammatically shown the four temporally interlaced fields successively transmitted, already shown at FIG. 3, by adding in each line a spatial interlacing of the sub-elemental areas corresponding to the opposite primary colors. In each line, the void spaces represent the opposite color temporally interlaced in the same line, but only some sub-elemental areas are shown since their number and their configuration have no relevance as demonstration of the inventive principle. The sole fundamental need is that the sub-elemental areas be actually such in comparison with the elemental areas, i.e. said sub-elemental areas must be sufficiently small so that in each resolvable element of the picture may be included both the opposite primary colors, and said sub-elemental areas must also be sufficiently small whereby to them corresponds a structure less visible than that of the picture lines. Practically it will be convenient that the structure inherent to the assembly of the sub-elemental areas be formed by more or less vertical small lines, crisscross with the horizontal lines inherent to the scanning operation, since is thereby reduced the visibility of both structures avoiding any formation of moiré. FIG. 5 corresponds to these wanted conditions, if the horizontal extent of the sub-elemental areas is adequate.

By working in the original described way, should one color of the televised picture exactly correspond to a saturated primary color, in each elemental area only the sub-elemental areas inherent to a single primary color will be activated, said sub-elemental areas comprising the whole detail without being visible due to their sub-elemental character, and being activated all of the lines, the color will be uniform. On the contrary, if a more or less whitened mixing of primary colors is present, as commonly occurs, this whitening is reproduced by the activation of the opposite primary colors each of which shows one part of the detail by the associated sub-elemental areas, which thus control the saturations, integrate the detail in its actual totality and embody a practically perfect structure uniformity, the single sub-elemental areas, in fact, being always less visible than in the previously considered representation of the saturated colors.

Figure 6:
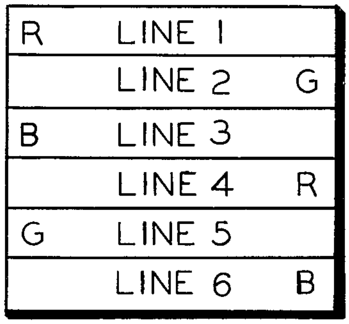
FIG. 6 shows an odd field and an even field interlaced and operated by the first triad of primary colors.

The FIG. 5 together with FIGS. 6 to 9 inclusive, allows the understanding of the number of additive syntheses by means of which the white is formed according to the present invention, said number forming one of the fundamental features of the present invention in comparison with all of the known color television systems. Obviously, as far as visible effects are concerned, an odd field and an even field, if subsequent, may always be considered temporally interlaced for any sequential order thereof. FIG. 6 shows that by the same triad R, G, B, are activated two interlaced fields, these three primary colors being active on three whatever subsequent lines in the spatial succession of the picture lines, forming thus the white by additive synthesis. In the line sequential known systems the additive fusion between contiguous lines is practically limited to minimum seeing angles, since the scanning must be strictly confined within said lines, while according to the present invention, the scanning is vertically extended in conformity with the energy distribution inside the scanning spot, as shown at FIG. 16 and as it will be specified hereinafter, since the sub-elemental interlaced areas render possible such an extension corresponding to the maximum scanning efficiency. Thus, in the meantime, the additive fusion between the contiguous line is rendered possible, and also the associated formation at white.

Figure 7:
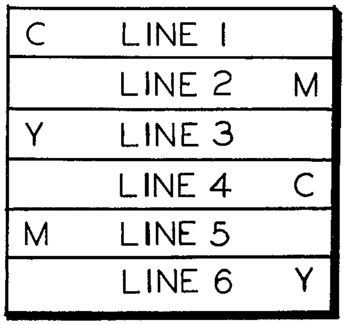
FIG. 7 shows an odd field and an even field interlaced and operated by the triad second of the primary colors, in conformity with the present invention.

This same situation occurs by the triad of primary colors C, M, Y as shown at FIG. 7, with a similar additive fusion of the contiguous line and a similar white formation.

Figure 8:
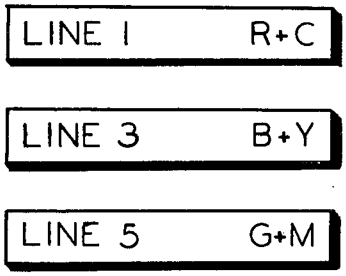
FIG. 8 shows the interlacing of the opposite primary colors in the odd lines, according to the present invention.
Figure 9:
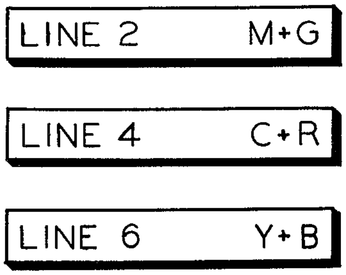
FIG. 9 shows the interlacing of the opposite primary colors in the even lines, according to the present invention.

FIG. 8 shows that two subsequent whatever odd fields form the white on all of the odd lines by the three pairs of opposite colors of both triads. FIG. 9 shows that two whatever subsequent even fields form the white on all of the even lines by the same three pairs of opposite colors. Since the mixing of the opposite colors is automatically ensured for each elemental area, this mixing has a prevailing importance.

On the whole, therefore, by the present invention, the white is generated by five different additive syntheses, while in all of the known three color television systems, the white is obtained by a single additive synthesis. Noting that the aforesaid five syntheses are temporally and spatially interlaced to one another, and considering, furthermore, that the same number of additive syntheses works also in all of the more or less desaturated color mixings, it is obvious that the effects of the various syntheses are statistically integrated between one another, so that necessarily is increased the stability of the picture colors, as well as of the brightness ratios, and also the compatibility of the color image with the black and white image is improved.

A first form of practical embodiment of the color reproducer, according to the present invention, corresponds to the diagram shown at FIG. 10 wherein 39 is a cathode-ray tube, with three electron guns directly connected to the commutator 35 of FIG. 2; thus each electron gun receives the signals related to one of the three primary colors R, G, B, as seen at FIG. 10. Through the color control device 40, which may be formed either by a mask or by a grid, the three primary colors juxtaposed on the receiving screen 41 are separately activated by the three electron beams. The connection 42 indicates that the receiving screen is scanned by deflecting the electron beams like in the common black and white television, the field and lines sequence being always exactly synchronized with the commutation of the primary colors. The signals incoming from the commutator 36 of FIG. 2, corresponding to the three primary colors C, M, Y, have double connections with said three electron guns, whereby the signals related to each of these three primary colors operate those two electron guns activating those two primary colors of the first triad, which, by additive synthesis, reproduce the same hue of the primary color of the second triad inherent to the considered signals. As shown at FIG. 10, the signals corresponding to C color are connected to the electron gun of the G color and to the electron gun of the B color; likewise the signals corresponding to the M color are connected to the electron gun of the R color and to the electron gun of the B color, and the signals corresponding to the Y color are connected to the electron gun of the R color and to the electron gun of the G color.

Practically, in conformity with FIG. 10, all of the aforesaid double connections are so embodied that each of the three pairs of electron guns activates two primary colors of the first triad according to exact and controlled proportions, so that actually, when together activated, the colors G and B reproduce the hue of the color C, and activating together the colors R and B is reproduced the hue of the color M, and activating together the colors R and G the hue of the color Y is reproduced, always in synchronism with the commutations.

It is clear that by operating as hereinbefore described, with the specified connections, in conformity with the present invention, any three primary colors cathode-ray tube, with three electron guns, either combined with any type of mask, or combined with any efficient control for the activation of the single primary colors on the receiving screen, and therefore also with any phosphor configuration on said screen, if distributed in sub-elemental areas, may be used as color reproducer in combination with the devices and methods according to the present invention. And this is possible also using whatever cathode-ray tube having three primary colors activated by a single electron gun in combination with directional control systems for the beam, in lieu of the other electron guns.

As a conclusive specification of the first embodiment of a color television receiver according to the present invention it must be put into evidence that the signals are received identically as in a common black and white television receiver with the conventional transmission standards, and that in each field the color signals are alternated in the corresponding lines as in any known line-sequential color television system, the color signals being finally utilized in a conventional tricolor reproducer after having separated the color signals in conformity to the two tricolor processes and having combined the three chromatic oppositions. In particular, if a commercial tricolor tube with three electron guns is used, that is, a tricolor tube of the most known type, the three guns are operated sequentially, but the operation is a very specific one pertaining to the present invention and effected with specific circuits and results, so that the difference from any other line-sequential systems is fundamental. In fact, in all line-sequential color television systems supposed to be compatible and able to reproduce correctly the natural colors, said reproduction is effected by a cycle of three complete frames each one operated by the same tricolor process, in the present invention, on the contrary, the cycle includes only two complete frames operated by two tricolor processes chromatically opposite. Moreover, inasmuch as said two tricolor processes are colorimetrically correlated, and, therefore, each primary color of the second tricolor process may be obtained by the activation of two primary colors of the first tricolor process, each primary color of the second tricolor process on the receiving screen is obtained activating simultaneously two guns by the same color signal, namely, along each scanning line the chromatic opposition is realized activating with the frame alternation during one frame one gun and during the consecutive frame the other two guns together. It is expedient, obviously, to interpose resistors in the connections with the guns in order to adequately proportionate the signals.

A tricolor tube having only one electron gun may be used, in the present invention, as any other efficient tricolor tube. But in such a case a particular operation must be pointed out on account of the fact that no color separation is needed before the activation of the single gun, the gun being operated by the signal directly and identically as in a common black and white television receiver, so that, obviously, the operation is the simplest. It goes without saying that, being the signal a line-sequential arrangement and having only one gun, no color commutations must be effected before the gun operation, the color commutations already described are to be effected only with reference to the receiving screen, operating on the electron beam in conformity with the forms of operation of such tubes. Thus, as these tubes are generally working by means of grids, which control the color activation changing their potentials, every person skilled in the art can see that using such tubes in combination with the present invention is by far simpler than using them with any simultaneous systems. In fact, if any simultaneous signal is used three primary colors are activated in each minimum resolvable picture element, and if a signal according to this invention, as now described, is used, then, only one primary color is activated in each minimum resolvable picture element during two fields and, moreover, along each scanning line the color remains the same so that the control of the electron beam is extremely simplified. During two consecutive fields two primary colors are to be activated, but also this condition is a basic simplification in comparison with the use of simultaneous signals.

Anyway, even if these examples represent such forms of realization of the present invention that practically most components of the combination are already very known and available at once, whereby all technical difficulties are really eliminated, it does not follow that in this way all the advantages of the present invention are utilized. Other examples with more advantageous color reproducers are described.

As a practical embodiment a receiving screen may be considered wherein the three primary colors R, G, B, are juxtaposed as vertical small lines and controlled by a corresponding apertured mask. FIG. 12 perspectively shows that the screen 51 is horizontally scanned, through the vertical apertures of the anteposed mask 52, by the electron beam 53 activating the primary color B, moving in the direction of the arrow 54, showing the scanning of the line wherein the color B is to be activated. Likewise, FIG. 13 perspectively shows as the screen 55, through the mask 56 is simultaneously scanned by the electron beam 57 activating the color V and by the beam 58 activating the color R, both moving concurrently in the direction of the arrow 59, showing the scanning of the same line scanned in the preceding figure in another field. The two so activated colors R and G, form, by additive synthesis, the color Y opposite to the color B activated in the preceding figure, as the chromatic diagram of FIG. 4 clearly shows, said figure showing also that not only the hue of color Y is exactly reproduced, but also, to a certain approximation, also its saturation.

The final result is that when any line is scanned, all of the vertical small lines are transversely activated, to any spatial and temporal interlacing of the opposite colors together forming the white along the scanned line. During each single scanning only operate the signals related to a single primary color so that the picture tube works in the same conditions as in the common black and white television. By this same picture tube may be received black and white pictures, always operating in the same way, and furthermore, when the commutators are excluded, and if the three electron guns are simultaneously operated by the same signals, the color reproducer works as a common black and white receiving picture tube.

A second form of practical embodiment for the color reproducer, according to the present invention, corresponds to the schematic combination of FIG. 11, wherein a cathode-ray tube referenced 47 is operated with an electron gun 50, which receives all color signals of both the tricolor processes by the line-sequential color transmission already specified. The diagram shows that all six primary color signals reach the same electron gun. This single gun is operated, as it was explained with reference to the known tricolor tube used with simultaneous signals and having only one gun, directly by the conventionally received signals, namely, the operation remains exactly the same as in common black and white television receivers. The color commutations, already described as a general characteristic of the present invention, are not effected, in this case, separating the color signals inherent to each field and each line, but only controlling the electron beam so as to activate on the receiving screen the primary color corresponding to the signal operating the gun during each scanning line. Every person skilled in the art can see that this form of operation not only simplifies very much the receivers but also is an easy way to simplify the tricolor tube. As a matter of fact, in conformity to the preceding explanations, in the known tricolor tube having only one gun a color commutation is effected on the receiving screen producing an oscillation of the spot, so that three lines corresponding to the three primary colors are activated during the exploration of each minimum resolvable picture element, the simultaneous signals having been decoded and gated, and said oscillations having been synchronized with the gates. If such tubes are used in combination with the present invention, remarkable simplifications are possible, as afore pointed out, however, during alternated frames two primary colors must be activated in each minimum picture element. On the contrary, even this double activation may be avoided so that another very important simplification may be realized, if the control of the spot on the receiving screen is effected in accordance with both the tricolor processes. Namely, if the primary colors of the second tricolor process are structurally present on the receiving screen as well as if these primary colors are functionally obtained by a couple of primary colors of the first tricolor process, a statical control of the electron beam may be sufficient, providing that each primary color is separately controlled. In this way, any necessity to use the high frequency oscillation of the spot is completely avoided, and, consequently, the difficulties inherent to the tricolor tubes having only one gun are really eliminated. Practically, instead of having three different voltages alternately controlling the electron beam at high frequency as in the aforesaid tricolor tubes, according to the present invention six different voltages are provided each one of them statically controlling the electron beam along each scanning line, three voltages being utilized during two consecutive fields and the other three during two other consecutive fields, that is in a regular alternation identically corresponding to the frame frequency. To provide such different voltages is extremely simple inasmuch as each voltage remains the same during the corresponding scanning line and is changed during the blanking intervals of the common scanning process. Thus, the different colors are not to be gated in synchronism with the positions of the spot corresponding to the different phosphor lines on the receiving screen during each high frequency oscillation as in the known simultaneous systems, and the high frequency oscillations of the spot together with the three gating processes may be completely eliminated. Moreover, instead of controlling the spot on the receiving screen by means of adequate deflections of the electron beam effected using control grids closed to the screen and operated by the aforesaid different voltages as in known tricolor tubes, the same control may be effected using adequate masks and deflecting the electron beam at the beginning, that is, before the regular deflection inherent to the scanning process. In this way other simplifications are possible, on account of the features specific of the present invention, which are now described. The combination represented in FIG. 11 shows that the electron beam emitted by the gun 50 is deflected by the means symmetrically referenced 43, generating an electromagnetic field that remains unchanged during each scanning line and obliges the electron beam to leave the gun, or any proximal point, with a specific direction, namely, with an initial deflection corresponding to a single primary color. This initial deflection is utilized after the focalization of the beam on the screen, inasmuch as the initially deflected electron beam approaches the screen with such a direction that, on account of the mask closed to the screen, only the selected primary color is activated. In the neck of the tricolor tube referenced 47, the focalization of the electron beam is effected by the converging coils referenced 44, this focalization and the inherent means being conventional and operating independently from the initial deflections of the beam, that is to say, no matter how the electron beam was initially deflected, it reaches the aperture mask into the same apertures which are reached by the electron beam when no initial deflection is effected, whereby the same picture elements are activated independently from said initial deflections. The reference 46 indicates that the electron beam is finally deflected as in any picture tube, in order to perform the conventional scanning process, which, therefore, is completely independent from the selection and alternation of the primary colors to be activated in each scanning line. As the scanning process is effected by conventional means, any adequate means may be used and no specification is necessary. If a deflection yoke is preferred, it must be sufficiently anastigmatic in order to perform properly. The connection referenced 45 represents the supply of the voltages operating the means 43 which deflect initially the electron beam. This voltage supply is controlled by the synchronizing means used in the scanning process, inasmuch as each voltage is identically and statically maintained during each scanning line, and is changed during the blanking interval after the scanning of each line, so that three different voltages are supplied during each field at a low frequency. As a conclusion, the color selection performed by the deflecting system is an extremely simple operation combined with the scanning process. It must be pointed out that the inherent arrangements do not involve any difficulty for the experts of the art, on account of the fact that said arrangements are substantially a great simplification with regard to another color selection deflecting system already realized and described long ago (Proceedings of the Institute of Radio Engineers, Color Television Issue, October 1951, pages 1194–1201). As a matter of fact, all the difficulties inherent to said realization were dependent upon some very specific features: the use of a continuously changing deflection of the beam at high frequency, the space charge limitations, the high frequency color selections and color gatings with the corresponding high frequency blanking intervals between the color selections, and finally the color purity problems originated from the high frequency color alternations. All these difficult problems and features being completely eliminated in the embodiment of the present invention now described, because during each scanning line only one color selecting voltage is utilized as a constant voltage producing a constant deflection, then, comparatively, the manifold and great simplifications in construction and operation of this embodiment become explicit. In FIG. 11, the reference 48 represents the aperture mask, which operates as a control device obliging the electron beam to activate only the primary color corresponding to the incidence direction of the beam itself. Necessarily, the apertures of the mask are so arranged that the areas activated by an aperture, changing the incidence direction of the beam, must be included in a minimum picture element. It goes without saying that, if phosphor color lines are used on the receiving screen, and the apertures of the mask, therefore, are also linear, the mask becomes structurally a grid located parallelly to the phosphor lines of the screen, but, in general, no limitations are to be considered about the structure of the mask and its form besides the arrangement of the apertures with respect to the receiving screen.

Each primary color is caused to correspond to a determined initial deflection of the electron beam issued from the gun 50, and said deflection defines said beam so that through the control device 48, which may be comprised either of a mask or of a grid, on the receiving screen 49 is activated the color inherent to the initial deflection of the beam. The distribution of the primary colors on the receiving screen may be embodied in different forms, some of which, in that they are particularly convenient, will be now specified. Also the number of the primary colors can be changed, as some of said colors may be additively obtained.

When a receiving screen is used whereon are juxtaposed only the colors of the first triad, in form of vertical small lines, as in the case already discussed, the activation of the colors of said first triad, is carried out as in FIG. 12 and in an exactly conform way, explained in connection therewith. The generation of the colors C, M, Y, inherent to the second triad of the primary colors and which are not present on the receiving screen, occurs as perspectively shown at FIG. 14, where the screen 60, through the control device 61 is scanned by the electron beam 62 moving in the direction of the arrow 63 likewise to FIG. 12, with the exception that in FIG. 12 the beam reaches the screen according to three different directions, while it is clear that according to FIG. 14 the beam reaches the screen according to six different directions, three of which are intermediate with respect to the others and correspond to the contact line of two vertical small lines, so that two small lines are activated by the same scanning spot forming thus the primary colors of the second triad, each by the additive synthesis of one pair of primary colors of the first triad. In fact, FIG. 14 shows that the beam simultaneously activates both the vertical small line R and also the line G, thus generating the color Y and practically embodying the same effect obtained by means of two beams according to FIG. 13.

Some novel and important advantages may be obtained if a receiving screen is used wherein are included all of the six primary colors inherent to the two triads and said colors are activated by the six different directions of the electron beam according to the diagram of FIG. 11.

Obviously the same final result is obtained even if two electron guns and three initial deflections are used, or by any other evident combination of guns and initial deflection means, together with masks or grids.

FIG. 19 perspectively shows an advantageous form of practical embodiment according to which the receiving screen 68 is formed by vertical small lines corresponding to six primary colors, so arranged that each primary color of one triad is interposed between two primary colors of the other triad, which by additive synthesis reproduce the same hue of the interposed color. This figure shows that, through the apertures of the mask 69, the electron beams 70 and 71 scan the line shown by the arrow 72 activating thus the two opposite colors inherent to the same line, in conformity with the alternating fields, each color corresponding to one beam direction which is varied according to the color commutations characteristic of the operation mode of the present invention.

A novel and very useful practical result reached by using the aforesaid type of screen is evidenced by FIG. 20 wherein the screen 73 is alike that of FIG. 19, however, with enlarged apertures in the mask 74, so that the electron beams 75 and 76, scanning the line shown by the arrow 77 identically to the scanning operation shown at FIG. 19, activate on the screen 73 a zone which is the more extended than that activated on the screen 68, the more have been enlarged the apertures of the mask 74, with respect to those of the mask 69. Notwithstanding this enlargement all of the hues remain perfectly equal due to the fact that each primary color is interposed between two primary colors the additive synthesis of which exactly reproduces the hue of the color interposed between the considered colors. Thus, for instance, in case of FIG. 20, the electron beam 76 activates the vertical small line Y and partially the two contiguous small lines R and G which form together yet the same color Y with a minimum desaturation, the hue remaining always unaltered.

Obviously, by the vertical small lines receiving screen, any vertical extension of the activated zone leaves unaltered the color. This fact, in combination with the possibility of horizontally broadening the activated zone, eliminates all of the difficulties associated to a severe limitation of the scanning spot, as well as those associated to an excessive focusing, allowing thus an easy increase of the brightness.

The results obtained by working as hereinbefore described, imply also other very important advantages which are characteristic features of the present invention and which are hereinafter disclosed.

First, the curve 64 of FIG. 15 shows the energy distribution into a vertical and central section of the scanning spot on the receiving screen, this curve corresponding, as it is known, to the error probability curve. It is also known that the area enclosed by such a curve is equivalent to the rectangle in which the height E.S.H. indicates the maximum energetic value in the scanning spot, while its base E.S.W. is commonly defined as the effective width of the scanning spot in the vertical direction, i.e. in the width direction of the lines. The maximum extent or maximum real diameter of the scanning spot corresponds, in this case to S.D. It is known that due to the movement, the effective width of the scanning spot is subjected to a reduction equalling about 12 percent. Working in maximum efficiency conditions, and ensuring the best uniformity throughout all of the picture, the reduced effective width of the scanning spot, must equal the L.W. of the lines scanned by the same spot in the direction of the arrow 65. Under these conditions of maximum efficiency, as shown by FIG. 15, the real maximum diameter of the scanning spot, in the vertical direction necessarily equals the width of three lines. These proportions, which greatly enhance brightness, uniformity, and detail are easily embodied in black and white television, but in color television novel problems and far greater difficulties are thus introduced; however the present invention perfectly overcomes these problems and difficulties.

By working under the aforesaid maximum efficiency conditions, as shown at FIG. 16, the distribution curve of the energy inherent to the scanning spot of each primary color is superposed to a relevant extent to the curves corresponding to the other primary colors operating in the contiguous lines, and these superpositions produce excessive saturation losses as well as alterations of the hues by mutual contamination of the colors. If, in order to avoid these inconveniences the scanning spot is restricted until it is totally included into each line, the other conditions are degraded and the difficulties and the losses associated to an extreme focusing of the scanning spot occur, particularly if very thin lines are used. By the present invention, on the contrary, the work is carried out in maximum efficiency conditions, all of the color contaminations are avoided, and also avoided are the difficulties of an accurate focusing. Furthermore the remarkable losses inherent to the passage of the scanning spot through very reduced holes, and associated to excessive registering exigencies are avoided.

In fact, by interlacing the colors in conformity with the present invention and using the already described vertical small lines screens, the effective width of the scanning spot E.S.W. may be identical to the width L.W. of the scanned line, as the vertical extension of the scanning spot, even if entering the contiguous lines causes no color contamination. This is clearly seen considering the rectangle 66 of FIG. 17, the rectangle 67 of FIG. 18 and the rectangles 79, 80, 81 of FIG. 24, all of these rectangles, representing the zones activated by the scanning spot through the mask asssociated to the screen shown at each figure, show also that the vertical extension of the activation can bring no variation to the colors. FIG. 17 shows the activation of one color in a three color screen, FIG. 18 shows the activation of a single color in a six color screen, and FIG. 24 shows the activation of two interlaced opposite primary colors along one line, in any case it is clear that the results of the scanning are always independent from both the vertical extension of the spot and the position of the scanned line on the screen.

The scanning spot entering the contiguous lines does not reduce the detail since, as in black and white televising, by the aforesaid spot extension the best power concentration within the scanned line is obtained and in fact the maximum uniformity through the picture is obtained. Furthermore, under these conditions, adequately bright pictures are obtained due to the greater amount of power which can be carried by the electron beam.

The aforesaid vertical extension of the scanning spot which, under the maximum efficiency conditions, corresponds to the width of three lines, although practically forming only a margin shading of the scanning spot, is very usefully utilized by the present invention, by improving the color fusion and the picture structural uniformity. The energy distribution curves associated to the same primary color, come into contact with one another, in fact and as seen at FIG. 16, considering the curves associated to color R, while the curves of the contiguous lines are relevantly superposed, but when a single primary color is represented, for instance R, between two lines corresponding to R there are two lines one of which is activated by Y and the other by M and said two contiguous lines are far better mixed to one another in that the vertical extensions of Y and M are interlaced to one another, i.e. in that the contiguous lines are partially compenetrated by said vertical extensions. As clearly shown at FIG. 30, this compenetration of the lines Y and M ensures the additive fusion of said lines, and therefore the reproduction of the same hue of the line R actually in the intermediate position between the lines R, so that the hue R results to be statically uniform, with no disturbing crawling effects of the lines as typical of the line sequential systems. Furthermore, since each line R is compenetrated at either side of the lines Y and M, a slight reduction of the saturation of R occurs with no hue change, whereby also the saturation is uniform throughout the so activated zone. These improved conditions of colors fusion and uniformity, identically repeated in the representation of each single primary color of both the first and the second triad, can always be adequately refined in that the horizontal interlacing can be refined independently from the size of the scanning spot, said size, in any case, remaining in conformity with the conditions of maximum efficiency.

In the forms of practical embodiment of the color reproducer, according to the present invention, hereinbefore described, the opposite color interlacing along each line is obtained by an exact registering of the vertical small lines of the receiving screen with the vertical apertures of the control device which may be simply comprised of a wire grid blocking the electron beam, i.e. generally a vertical aperture mask, or a grid having a voltage proportioned to a determined voltage of the screen, whereby the electron beam is focused on said screen, improving thus the exploitation of the power of the electron beam and also the horizontal resolution. However, even by a simple mask, without this terminal focusing, the present invention allows very satisfactory results to be obtained. Considering the rectangle 76 of FIG. 17, the rectangle 67 of FIG. 18 and the rectangles 79, 80, 81 of FIG. 24 it may be seen that the horizontal variations of the activated zone shown by the above mentioned rectangles imply no alteration of the hues but only a minimum desaturation whereby it might be convenient to enlarge the mask apertures in order to improve the brightness and in the meantime to improve the structure by reducing the intervals between the activated areas. Due to its simplicity and efficiency the vertically apertured mask, in combination with the other device associated to the present invention and in conformity with the operation methods of the same invention, forms one of the preferred types of mask. However, the persons skilled in the art will be in position of providing other types of mask and other color arrangements, always remaining in the frame of the present invention and exploiting its advantages.

Particularly, from the last described practical embodiment, other forms may be deduced with further specific advantages by interlacing not only horizontally but also vertically the opposite primary colors.

FIG. 21 shows a novel and very useful arrangement of the six primary colors on the receiving screen obtained by embodying the aforesaid double interlacing of the opposite primary colors. In the horizontal direction said colors are arranged in conformity with the already disclosed principle that each primary color of each triad is interposed between two primary colors of the other triad, which by an additive synthesis, exactly reproduce the hue of the interposed primary. Vertically the arrangement is that the primary opposite colors are interlaced in each line. Thus, instead of having monochromatic vertical small lines, vertical small lines are provided which are comprised of an alternation of subelemental areas inherent to opposite colors.

This screen is readily obtained from that with vertical small lines by dividing each scanning line into two horizontal small lines having an half-width in the vertical direction, and spacing away the lower small line with respect to the upper one within each line until the opposite colors are vertically aligned.

By the same horizontal displacement from the already described vertical apertures mask, the mask type shown at FIG. 22 is readily obtained, and this type is to be used in combination with the screen shown at FIG. 21. By this apertured mask, through any aperture 78 shown at FIG. 22, six subelemental areas are activated corresponding to six primary colors identified by six incidence directions of the electron beam onto the mask, said incidence directions being obtained by deflecting the beam like the diagram of FIG. 11.

While when the vertical small lines screen is used, each primary color is horizontally repeated every six small lines, and at least six small lines must be included within each minimum resolvable element, when the screen of FIG. 21 is used, although working with six primary colors, the same primary colors are repeated within each line every three subelemental areas, and thus it will be sufficient to include into each minimum resolvable element only three subelemental areas in the horizontal direction. The picture structure is remarkably improved, particularly in the representation of the single primary colors, yet keeping all of the other advantages. As seen at FIG. 21, each subelemental area corresponding to any primary color is repeated together with a subelemental area of the opposite primary color, three pairs of opposite primary colors being thus horizontally interlaced, while each pair forms a vertical interlacing. Therefore the size of the scanning spot remains that corresponding to the maximum efficiency, and the horizontal width of the mask apertures may be greater than that of the vertical small lines screen, with the further possibility of a greater widening while obtaining the same saturation, as the activation of one fraction of the lateral subelemental areas is proportional to the interposed subelemental area.

The nature and the importance of the advantages disclosed with respect to the apertures of the masks, in confromity with the present invention, are evidenced considering that in all of the already embodied color television systems using small apertures masks, it is necessary that said holes be at each side lesser than the single subelemental areas of the screen, in order to reduce the contamination excess of the colors due to the fact that in all of the aforesaid previously known systems using three primary colors, each single subelemental area of each primary color is always surrounded throughout its periphery by the other two primary colors which together form an opposite color causing excessive desaturation, so that the minimum registering errors and also the marginal radiation of the activated zones produce excessively desaturated color, a defect which is avoided by the present invention.

As final explanations about the forms of realization now described, it must be noted that to replace six horizontal incidence directions with three horizontal incidence directions and a vertical direction in connection with each horizontal direction is not at all a problem nor a complication. In fact, working with three horizontal incidence directions, the central direction is automatically obtained without any deflecting voltage, and the two symmetrical directions can be obtained, without any difficulty, by changing the polarity, so that this arrangement is obviously a simplification.

If two electron guns are used, each one represents three incidence directions of which only two must be obtained by initial deflections, each gun having a proper direction of incidence even if no deflecting voltage is present. In addition, it is to be pointed out that, utilizing each gun to operate each tricolor process, it is sufficient to synchronize the operation of each gun with the frame frequency inasmuch as each gun must operate during two fields. Thus, in order to synchronize all the colors in the scanning lines it is only necessary to synchronize alternately a voltage and a change of polarity in the electromagnetic deflecting means, effecting the synchronization during the blanking intervals of the common scanning process, at a frequency derived from the line frequency, and, consequently, the color control being a very simple extension of the scanning process. The two guns operating in synchronism with the frame frequency, it goes without saying that the alternation of the two tricolor processes is obtained as an automatic result.

In all the embodiments of the present invention described until now, in each minimum resolvable picture element of the receiving screen are included six primary colors or, at least, the three primary colors of the first tricolor process so as to obtain the other three primary colors inherent to the second tricolor process by the activation of a couple of primary colors of the first tricolor process. As a consequence of this arrangement, the position of the scanning lines on the receiving screen is completely independent from the color to be activated, because any color may be activated in any position of the scanning line. In this way, as far as the position of the scanning lines is concerned, the operation is the same as in common black and white television and no better or special control is necessary, though an accurate field interlacing is worthy of more attention even if conventionally performed.

The activation of the opposite primary color in each scanning line is a requirement automatically realized in transmission, on account of the fact that the signal is formed by the color commutations alternating the opposite primary colors as it was already specified, and finally attained on the receiving screen by the conventional scanning process, whereby no problems are involved in addition to the common black and white television at the present level of the art. Even if the picture is shifting on the receiving screen, the colors of the picture remain the same, as a general effect, because each field and each frame include a complete tricolor reproduction self-sufficient to obtain all natural colors as well as the black and white range, this tricolor reproduction being effective in all areas in which a correct reproduction of natural colors is to be visually discriminated. In the very small areas the visual results depend upon a regular functioning of the scanning process and field interlacing, inasmuch as the three bicolor processes are effective in each minimum resolvable picture element by cycles of two superposed frames. Anyhow, the efficiency of the color reproduction working in these conditions is necessarily much better than in the known simultaneous systems, on account of the facts that, according to the present invention, all operations are simplified and the three bicolor processes are effective at all levels of saturation and brightness, in the known simultaneous systems, on the contrary, the cancellation process corresponding to cycles of two frames is impaired in all animated scenes and in all areas with high level of brightness. Moreover, the color reproduction in the known simultaneous systems is always impaired by cross talks between the chrominance channel and the luminance channel, whereas according to the present invention all cross talks are totally avoided for the transmission is effected by means of only one channel.

As a general characterization of all the embodiments of the present invention, it must be put into evidence that all said embodiments may be divided in two very explicit classes, in the first class being included all the embodiments which, like all the preceding examples and their variations and modifications, have in common the specific feature that in any minimum resolvable picture element any primary color of both the tricolor processes may be activated, and no special control of the position of the scanning lines on the receiving screen is necessary in addition to the regular controls used in black and white television. In the second class are included all the embodiments which, on the contrary, do not possess said specific feature, and, therefore, some additional control is implied.

Examples of the second class will be given hereinafter so as to explain the advantages which can be realized notwithstanding some additional registration of the scanning lines.

On account of the fact that, according to the present invention, only two opposite primary colors are to be activated along each scanning line, it goes without saying that if the position of each scanning line on the receiving screen is controlled it is not necessary to include in each scanning line more primary colors than those to be activated.

A third form of practical embodiment of the color reproducer in conformity with this invention, is effected interlacing in each scanning line subelemental areas inherent to only the two primary colors to be activated. The geometrical pattern of this interlacing is not limited, and it may be refined so as to obtain a very satisfactory uniformity of the visual effect in the representation of each color and to realize a perfect additive synthesis of the subelemental areas inherent to different primary colors. Said geometrical pattern is, obviously, independent from the transmission band. However, in each minimum resolvable picture element must be included subelemental areas inherent to two opposite primary colors, so that at least two subelemental areas are included in each minimum resolvable picture element.

Operating in this way, if along a scanning line the two primary colors are both activated, all the subelemental areas are activated and, consequently, no black areas remain interposed. As a final result, the brightness is notably increased, structure and detail are improved. Necessarily, a registration must be effected in order to operate with a bicolor process in those lines in which the two corresponding colors are present. It goes without saying that when a bicolor process is controlled on the receiving screen, the other two bicolor processes are automatically controlled, on account of the regular alternation of the primary colors of each tricolor process.

This registration was not necessary in the other embodiments of the present invention pertaining to the first class as before mentioned, therefore, it must be pointed out that this registration or similar registrations of the scanning lines in addition to the regular controls used in black and white television do not represent a specific requirement of the present invention but they are only means for obtaining some new improvements.

A simple and convenient distribution of the colors on the receiving screen is shown at FIG. 23 where the relative location of the areas of the different primary colors exactly corresponds to the screen shown at FIG. 21, if the vertical lines are substituted for the horizontal ones and vice-versa. Thus, considering the FIG. 23, it will be seen that vertically each primary color is interposed between the two primary colors of the other triad which together reproduce the same hue of the interposed color. This vertical alignment of the six primary colors allows a scanning spot to be slightly extended outside the line, the hue would be unaltered and the desaturation would be minimum for, according to the example of FIG. 25, when the activated zone E.W. exceeds the width of the line L.W., the activated fractions of the contiguous zones, R, and G, pertaining to two lines contiguous to the scanned one, exactly reproduce the Y hue of the zone activated. Therefore, the utilization of the scanning spot may be practically carried out without losses, always in conformity with the present invention. On the contrary, by the known color television systems operating by a sole triad of primary colors, the contiguous zones, pertaining to the same triad of primary colors as the interposed zone, when activated generate the opposite color excessively whitening the interposed color, so that each color contamination is extremely noxious. Since in any activated zone, always a certain marginal radiation is present, and many are the causes whereby the registering may be defective, the known systems need of reducing the activated zone with respect to the worked area and this need implies the greater losses, the smaller are the subelemental areas. Comparatively, in conformity the present invention, at parity of other conditions, and following yet the example of FIG. 25, instead of reducing the zone activated from L.W. to R.W., said zone can be increased from L.W. to E.W., but this advantage is practically increased due to the fact that the screen of FIG. 23 allows the operation to be performed by subelemental areas having a greater dimension.

When a receiving screen with six primary colors is used in conformity with the present invention, the color saturation is comprised within the contour 37 of FIG. 4 which shows that in this case the reproduction of the second triad of primary colors is relatively improved with respect to the colors of the first triad. By the known systems with only three primary colors and simultaneous transmission, it would be theoretically possible a reproduction, with a greater saturation of the three single primary colors, but practically the colors are contaminated due to many reasons which, on the contrary, may be avoided according to the present invention, which actually embodying the saturation figures as shown in the diagram of FIG. 4, provides very satisfactory results. In fact, when comparing in FIG. 4 the contour 37 with the contour 38 including the saturations inherent to the commonly used dyes, it is easily understood that the saturation obtained according to the present invention are practically quite satisfactory, in that remarkable exceed those inherent to the diagram of the dyes.

In the practical form of embodiment of the now considered color reproducer, in order to control the registering of the signals in each line, use can be made either of a special mask, or a grid combination, both said devices being further elaborations of the present invention together with electron beam directional controls.

The mask as shown at FIG. 26 has a first set of aligned holes according to the arrow 83, showing the scanning direction, through said holes being scanned the first six lines 1, 2, 3, 4, 5, 6 of the receiving screen, while the subsequent six lines 7, 8, 9, 10, 11, 12 of the screen are scanned through a second set of aligned holes in conformity with the arrow 84, so that the spacing between two sets whatsoever of holes of the mask corresponds to six lines. The six deflections of the electron beam inherent to the diagram of FIG. 11 occur in vertical direction as seen at FIG. 27, where the locations of the electron beam are numbered in conformity with the order of the lines on the receiving screen, and where through the mask 85 the screen 86 is scanned by the electron beam 87 the deflections of which correspond to the six primary colors used on the same screen. It is to be particularly noted that the six directions of the electron beam 87, shown at FIG. 27, converge into the same holes of the mask, at subsequent times as the scanning of the corresponding lines is sequential, while simultaneously considered, said six directions converge on the same line of the receiving screen. This operational mode is totally different from that of the known color television systems, as presently used, wherein the directions simultaneously converge into the same holes of the mask. By the present invention the six electron beam directions structurally converge into the same line of the receiving screen, this structural convergence being statical and therefore also simultaneous, and each direction corresponding to a determined primary color with an order which is exactly inverted with respect to the color order of the receiving screen. Thus, when the electron beam, having already scanned one line and having to scan the subsequent line is deflected in conformity with the usual scanning devices, it automatically comes again to the same holes of the mask, and this return is repeated during a six lines scanning cycle, and then the beam passes onto the subsequent row of holes of the mask, where another six lines scanning cycle is performed and so on. Obviously, due to the common interlacing of the odd and even fields, at each field, the scanning cycle inherent to a row of holes of the mask corresponds to the activation of three lines of the receiving screen in an odd field and other three lines in an even field. FIG. 27 shows the scanning of the first nine lines of an odd field and that of the first three lines of an even field. As a final result, the scanning is performed as in common black and white television, being however inherent an adequate accuracy. But if the contour of the scanning spot 82 shown at FIG. 26 has a sufficiently great dimension with respect to the mask holes, the line activation in the exact color can be satisfactory notwithstanding some irregularity or oscillation of the beam movement during the scanning of the lines. Anyhow, in order to avoid that, due to remarkable errors in the line scanning, the beam remains out of the mask apertures, known control devices can be used in order to render sufficiently accurate said scanning and to this purpose also the secondary emission on the mask might be used since the extension of the intervals between one row of holes and the subsequent row, as is obtained by operating with the devices disclosed according to the present invention, allows the interposition of areas having such a different secondary emission as to control the scanning through the corresponding variations.

The registration between the signals of each line and the location of the line to which said signals are related, can be embodied, besides the aforesaid mask or other equivalent, also by the original combination of two grids as it will be hereinafter described, allowing the brightness to be increased.

It is known that if a voltage is applied to the screen adequately accelerating the electron beam, a proportioned and constant potential grid operates as a system of cylindrical lenses focusing said beam. Therefore, if a horizontal grid is substituted for the already described mask, by operating with the same specific correspondence between the screen lines and the previously disclosed electron beam directions, it is possible to control the colors and obtain also other advantages. At FIG. 28, the grid of horizontal wires 88, in combination with the screen 89 in front of which said grid is located focuses the electron beam 90 onto one determined line of said screen, in conformity with the incidence direction, apart from that particular position of the beam with respect to the two wires of the grid, between which the beam is passing through the grid. If the scanning, although being carried out substantially as in the common black and white television, is accurately performed, the axes of the six directions of the electron beam in the subsequent scanning of six lines as hereinbefore disclosed, pass all through the intermediate point between to wires of the grid, as shown at 91, said point corresponding to the center of the aligned holes of the previously disclosed mask. In the same FIG. 28, the electron beam is shown in three positions 92 related to the scanning of three even lines of the screen. Thus, finally, being the spacing apart between two horizontal wires of the grid correspondent to six lines of the screen, it is clear that thus operating, such a safety is obtained as to the position of the electron beam with respect to the grid, whereby the irregularities which may be expected of the scanning do not alter the exact activation of the lines according to the colors inherent thereto. In the meantime the loss of power occurring when the mask is used, in that the vertical dimensions of the scanning spot exceed those of the holes of said mask, is avoided.

The FIG. 29 shows in perspective detailed view, the receiving screen 93, already shown at FIG. 23, operating in combination with the just now described horizontal grid 95 and with the vertical grid 94 controlling the horizontal interlacing of the opposite colors along the single lines. The electron beam in its position as shown by FIG. 29, and referenced 96, is focused on the receiving screen in the subelemental area 97 inherent to the scanning of the line shown by the arrow 98. However, while the horizontal grid 95 must focalize the electron beam, as disclosed, within the lines, the vertical grid 94 can work either focusing the beam within the subelemental areas in conformity with the incidence directions corresponding to the opposite colors, or, in a simpler way, acting as a vertical aperture mask. If also the vertical grid 94 is a focalizing grid as the horizontal grid, both the brightness and the detail may be improved to a certain extent, but practically this increase is very limited in that the diameter of the vertical wires cannot be neglected with respect to the horizontal width of the subelemental areas, as, at least two subelemental areas must be included into each minimum resolvable line element. The brightness gain, on the contrary, is remarkably higher by the focusing operation carried out by the horizontal grid, due to the present invention allowing the operation, in this case, with a grid the wires thereof are relatively more spaced apart.

The horizontal interlacing of the opposite colors into the single lines requires two incidence directions which may be obtained by an initial horizontal deflection as specified in connection with FIG. 11, said deflection being eventually substituted by the addition of another electron gun acting every two fields identically to the electron gun shown at FIG. 11. As the screen of FIG. 23, in combination with the mask of FIG. 26, or in combination with the grid system shown at FIG. 29 implies a total of twelve different incidence directions for the electron beam, it is clear that these twelve different directions can be embodied by a single electron gun, six vertical deflections and one horizontal deflection, as well as by two horizontally side by side arranged electron guns and six vertical deflections, or also by three vertically set electron guns, with one vertical deflection and one horizontal deflection, and further with other combinations of this kind.

By the hereinbefore described methods and devices according to the present invention is always ensured the compatibility between color television and black and white television. The color television transmission is in full conformation with the usual black and white transmission, so that the usual black and white receivers are apt to receive the color transmissions as common black and white transmissions. Likewise, the color receivers are in position of receiving the common black and white transmissions as actual black and white, and the reception cannot be disturbed by the interferences and the inconveniences occurring in the systems using subcarriers. By the present invention the multiple formation of the white by the interlacing of the opposite colors in the single lines ensures the formation of black and white pictures with no chromatic disturbances. Furthermore, when the horizontal interlacing of the opposite primary colors is embodied by horizontally side by side arranged electron guns, for whatever type of color reproducer, these electron guns may be simultaneously operated by the same signals, so that along each line the white can be generated simultaneously instead of sequentially. By such an operative mode, having excluded also the commutators, the color reproducer practically works as a common picture tube for black and white television. This affords an improvement in the compatibility which implies no particular complication in the color receiver, and no complication either of the transmission or of the reception, implying only a particular operative mode inherent to this invention.

The use of electronic circuits and devices already currently applied for the common black and white television both for transmission and for reception can be considered an essential part of the preferred form of embodiment of the present invention, due to obvious reasons of compatibility and of standardization. However, this invention is not limited to any particular standardization and generally is not limited to special transmission, reception, commutation and operation circuits and devices in that no need subsists of using exclusively particular circuits and particular devices. In fact, this invention can be perfectly embodied by any unit of technical means sufficient to transduce the colors of the pictures to be televised into electric signals, to receive signals and to transduce same into suitably colored lights, developing and coordinating these operations in conformity with the methods of this invention which have been here exemplified.

Also the devices disclosed in their details, as specific elements of the different forms of practical embodiment, can be modified by the skilled persons. It is clear that the configuration of the subelemental areas on the receiving screen may be varied in a number of ways. Also curved masks may be used as well as special tubes might be used for shooting and receiving. Furthermore, special activating ways for the phosphors may be introduced and yet other changes.

Anyhow, all the aforesaid possible changes are comprised within the principles and the fundamental aspects of the present invention, whereby the appended claims are intended to cover all of the changes and modifications included into the inventive principles hereinbefore shown by all of the multiple structural and functional features subsequently considered in this specification and shown by the attached drawings.

I claim:

1. A television system for producing still and animated images with all natural colors faithfully represented by means of a line-sequential color transmission system compatible with common black and white television system, including in combination a color television camera effecting a tricolor analysis of the scene to be televised, conventional electronic means for adapting and matrixing the three outputs of the camera so as to obtain simultaneously, for each minimum picture element resolvable according to the highest frequency of the transmission band used in black and white television, the electrical signals representing the colorimetric proper proportions of the primary colors inherent to two different tricolor processes each one colorimetrically complete and self-sufficient to reproduce faithfully all natural colors and each one having its three primary colors opposite to those of the other, said two tricolor processes being used with proportioned intensity so that the signals inherent to each couple of opposite primary colors represent a bicolor process able to reproduce approximately all natural colors, the three different approximations corresponding to the three bicolor processes compensating each other automatically, electronic switching means excluding during two consecutive fields all the signals inherent to a tricolor process and putting into operation only the signals inherent to the other tricolor process so that the two tricolor processes are commutated with the frame frequency of the black and white transmission, electronic switching means excluding during each scanning line all the signals inherent to two primary colors of the operative tricolor process and transmitting only the signals inherent to only one primary color of the operative tricolor process, said switching means effecting in each transmitted field a conventional commutation of the three primary colors of the operative tricolor process according to the scanning line frequency so that the resulting line-sequential color transmission is electronically identical to black and white transmission, the aforesaid electronic switching means commutating the three primary colors of one tricolor process in a line-sequential transmission conventionally effected during two consecutive fields and the analogous electronic switching means commutating the three primary colors of the other opposite tricolor process in a line-sequential transmission conventionally effected during other two consecutive fields alternated with those inherent to the other tricolor process being all switching means equally synchronized by the same field frequency and the same line frequency operating the conventional scanning process, the sequence of the three primary colors of one tricolor process and the sequence of the three primary colors of the other opposite tricolor process being arranged according to their chromatic opposition whereby on account of the aforesaid synchronization automatically in each scanning line only the signals inherent to only two opposite primary colors are alternately transmitted in any two consecutive frames, a receiver set comprising in combination conventional electronic means for receiving the aforesaid specific line-sequential color signal as in any black and white receiver set, conventional electronic scanning devices, a color reproducer having a viewing screen in which only one primary color is in operation during each scanning line, and a system of electronic switching means controlling the activation of each primary color in the color reproducer by switching operations identically corresponding to those effected for arranging the primary color signals in the aforesaid specific line-sequential color transmission, the conventional electronic switching means effecting the alternation of the two tricolor processes being synchronized with the frame frequency operating in the receiver set whereby the activation of the primary colors of each tricolor process during two consecutive fields is automatically controlled, and the conventional electronic switching means effecting the alternation of the three primary colors operating in each field being synchronized with the line frequency operating the conventional scanning process in the receiver set whereby the color activation in each line is automatically controlled, such combined synchronizations of the aforesaid electronic switching means producing along each scanning line of the viewing screen the activation of two opposite primary colors in the cycle of two frames and also the alternation of the three couples of opposite primary colors along any three adjacent lines in any cycle of two frames, each couple of opposite primary colors effecting a bicolor process corresponding to an approximate color reproduction in the resolvable picture elements inherent to the transmission band as in conventional black and white television, and the approximate bicolor reproductions realizing together a complete color reproduction whereby any area resulting from three vertically adjacent resolvable picture elements includes full color reproduction as well as full color detail in the cycle of two frames.

2. A natural color television system compatible with common black and white television systems according to claim 1, wherein the colorimetric analysis of the scene to be televised is effected by a conventional tricolor camera of the type used in the color television system named NTSC, from which the signals inherent to the three primary colors of the first tricolor process are simultaneously obtained, the signals inherent to the three opposite primary colors constituting the second colorimetrically complete and self-sufficient tricolor process being derived from those of the first tricolor process by means of matrixing, so that all the signals inherent to the three bicolor processes are simultaneously utilizable.

3. A natural color television system compatible with common black and white television systems according to claim 1, wherein a color reproducer is used comprising a cathode-ray picture tube having a receiving screen coated with a geometrically uniform arrangement of phosphor dots emitting differently colored lights corresponding to the primary colors transmitted and received according to the aforesaid claim 1, all those phosphor dots are sized so as to be subelemental areas with reference to the minimum resolvable picture elements corresponding to the frequency band as in black and white television operation, each minimum resolvable picture element including the phosphor dots inherent to the bicolor process effected in two consecutive scannings of each line.

4. A natural color television system compatible with common black and white television systems according to claim 3, wherein the conventionally received line-sequential color transmission is utilized in a color receiver comprising reproducing all natural colors, an equally colored light being emitted during each scanning line by the electron beam activation of equally phosphor coated subelemental areas, said electron beam operation being equally maintained during each scanning line and automatically changed each line by means of the conventional scanning process operating with the same line frequency a black and white receiver set.

5. A natural color television system compatible with common black and white television systems according to claim 4, wherein is used a receiving screen including in each minimum resolvable picture element means for effecting six luminescent activations corresponding to the six primary colors of the two colorimetrically complete and self-sufficient tricolor processes, the three luminescent activations inherent to the first tricolor process being obtained by three different luminescent means, the three luminescent activations inherent to the second tricolor process being obtained in part by specific luminescent means and for the remaining part being obtained by additive synthesis of the means used in the first tricolor process, along each scanning line the subelemental areas inherent to each primary color being interposed between the subelemental areas inherent to those primary colors of the other tricolor process which reproduce by additive synthesis the interposed color.

6. A natural color television system compatible with common black and white television systems according to claim 4, wherein use is made of a color reproducer having a receiving screen comprising means for effecting three independent luminescent activations in each minimum resolvable picture element corresponding to the extension of the transmission band, said three independent luminescent means being inherent to the three primary colors of the first tricolor process, the three primary colors of the second tricolor process being obtained by combined activations of the aforesaid means, said combined activations being effected utilizing the signals inherent to the primary colors of the second tricolor process with their alternations resulting from the line-sequential color transmission and electronically switching these signals in the corresponding lines using double connections so as to activate by the signals pertaining to a single primary of the second tricolor process two primary colors of the first tricolor process in the same scanning line.

7. A receiver for natural color television compatible with black and white television according to claim 6, comprising in combination: conventional means for receiving color signals inherent to three primary colors corresponding to three phosphors arranged on the receiving screen in subelemental areas, means alternating with the frame frequency in the operation of the color reproducer the aforesaid signals with the signals inherent to the opposite primary colors, a cathode ray picture tube provided with a receiving screen having an arrangement of subelemental areas including the three primary colors in each minimum resolvable picture element, three electron guns and conventional means for activating separately the three primary colors, means connecting said three electron guns so as to operate them associated in three different pairs, switching means alternating in each scanning line with the frame frequency the operation of one electron gun activating the corresponding primary color and the operation of the couple of electron guns activating the other two primary colors which by additive synthesis generate the opposite primary color, such a color receiver working identically both as operations and as results to a common black and white receiver by discarding all the color commutations and connecting the three electron guns so as to operate them simultaneously by the same signals.

8. A natural color television system compatible with common black and white television systems according to claim 4, wherein is used a color reproducer comprising a receiving screen including in each minimum resolvable picture element of any picture scanning line means effecting only two different luminescent activations corresponding to a couple of opposite primary colors, along each scanning line being aligned subelemental areas alternating two primary colors, the subelemental areas inherent to the three couples of primary colors being aligned in a practically vertical direction and so arranged that each subelemental area inherent to each primary color is interposed between the subelemental areas inherent to those two primary colors of the other tricolor process which by additive synthesis reproduce the hue of the interposed color, whereby extending the activation of any subelemental area beyond the superior and inferior limits of the area itself no alteration of the hue occurs, the activation of each scanning line being synchronized with the line-sequential color signals.

9. A receiver for natural color television compatible with common black and white television according to claim 8, comprising a color reproducer provided with a receiving screen wherein the luminescent means are arranged in such aligned dots so proportioned that the vertical size of each dot corresponds to the vertical size of each scanning line, and the horizontal size of each dot corresponds to an even equal submultiple of the minimum resolvable picture element resulting from the highest frequency utilized in the receiver.

10. A color reproducer to be used in a receiver for natural color television compatible with black and white television according to claim 9, comprising in combination: a cathode ray picture tube provided with a receiving screen in conformity with the aforesaid claim and provided with one electron gun conventionally operated by the line-sequential color signal derived from the two colorimetrically complete tricolor processes, electronic means deflecting the electron beam horizontally and vertically before scanning each line so as to change the incidence direction of the beam in accordance with the color to be activated during each scanning line, two directions corresponding to the activation of the opposite primary colors in each line and six directions corresponding to the vertical interlacing of the six primary colors, a mask having its apertures aligned in horizontal rows so spaced apart that each row of apertures is used to activate six scanning lines, the incidence directions of the beam resulting from the vertical deflections converging in the same point of the receiving screen so that the scanning process automatically maintains the electron beam in the same apertures of the mask during each cycle of six scanning lines and the color alternation synchronized with the scanning process automatically transfer the electron beam from an aperture row to the following, and means focusing the electron beam independently from said deflections.

11. A color reproducer to be used in a receiver for natural color television compatible with black and white television according to claim 9, comprising in combination: a cathode ray picture tube provided with a receiving screen in conformity with the aforesaid claim and provided with two electron guns horizontally arranged side by side which are alternately operating with the frame frequency and each one activates primary colors opposite to those activated by the other, in each transmitted field the gun in operation being conventionally activated by the line-sequential color signal, electronic means vertically deflecting the electron beam before scanning each line so as to change the incidence direction of the beam in accordance with the color to be activated during each scanning line, six different incidence directions being used which correspond to the vertical interlacing of the six primary colors, a mask having its apertures aligned in horizontal rows so spaced apart that each row of apertures is used to activate six scanning lines, the incidence directions of the beam resulting from said deflections being convergent in the same point of the receiving screen so that the scanning process automatically maintains the electron beam in the same apertures of the mask during each cycle of six scanning lines and the color alternation synchronized with the scanning process automatically transfer the electron beam from an aperture row to the following, and means focusing the electron beam on the receiving screen independently from said deflections, the two guns operated by the same signals in the same line producing directly black and white.

12. A color reproducer to be used in a receiver for natural color television compatible with black and white television according to claim 9, comprising in combination: a cathode ray picture tube provided with a receiving screen in conformity with the aforesaid claim and provided with one electron gun conventionally operated by the line-sequential color signal derived from the two colorimetrically complete tricolor processes, electronic means deflecting the electron beam horizontally and vertically before scanning each line so as to change the incidence direction of the beam in accordance with the color to be activated during each scanning line, two directions corrseponding to the activation of the opposite primary colors in each line and six directions corresponding to the vertical interlacing of the six primary colors, two grids near the receiving screen, one of said grids having vertical wires so arranged to control the activation of the two primary colors in each scanning line such two colors being alternately activated with the frame frequency, the other grid having horizontal wires so spaced apart that during the scanning of each group of six lines the electron beam is maintained between two wires inasmuch as the six incidence directions resulting from the vertical deflections are converging at the same point of the receiving screen whereby the color alternation synchronized with the scanning process automatically transfers the electron beam from the space between two wires to the following space corresponding to the following wire after a cycle of six scanning lines, this horizontal grid being operated under a proper voltage with respect to the screen so that the beam passing between any two consecutive wires is focused in the line corresponding to the incidence direction inherent to the color to be activated in that line.

13. A color reproducer to be used in a receiver for natural color television compatible with black and white television according to claim 9, comprising in combination: a cathode ray picture tube provided with a receiving screen in conformity with the aforesaid claim and provided with two electron guns horizontally arranged side by side which are alternately operating with the frame frequency and each one activates primary colors opposite to those activated by the other, during each field one gun being conventionally operated by the line-sequential color signal, electronic means vertically deflecting the electron beam before scanning each line so as to change the incidence direction of the beam in accordance with the color to be activated during each scanning line, six different incidence directions being used which correspond to the vertical interlacing of the six primary colors, two grids near the receiving screen, one of said grids having vertical wires so arranged to control the activation of the two primary colors in each scanning line such two colors being alternately activated with the frame frequency, the other grid having horizontal wires so spaced apart that during the scanning of each group of six lines the electron beam is maintained between two wires inasmuch as the six incidence directions inherent to said deflections are converging at the same point of the receiving screen whereby the color alternation synchronized with the scanning process transfers automatically the electron beam from the space between two consecutive wires to the following space corresponding to the following wire after a cycle of six scanning lines, this horizontal grid being operated under a proper voltage with respect to the screen so that the beam passing between any two consecutive wires is focused in the line corresponding to the incidence direction inherent to the color to be activated in that line.

14. A natural color television system compatible with common black and white television systems according to claim 4, wherein is used a receiving screen including in each minimum resolvable picture element means for effecting six independent luminescent activations corresponding to the six primary colors of the two tricolor processes, along each scanning line the subelemental areas inherent to each primary color being interposed between the subelemental areas inherent to those two primary colors of the other tricolor process which reproduce by additive synthesis the hue of the interposed color, so that even if the activation of the areas inherent to a single primary color passing beyond the limits of such areas extends in the horizontally adjacent areas no alteration in the hue of the activated color occurs.

15. A receiver for natural color television compatible with black and white television according to claim 14, comprising in combination: a color reproducer provided with a receiving screen wherein the luminescent means corresponding to the six primary colors are arranged in small vertical lines, electronic switching means alternating the colors with the lines of the scanning process, electronic means sequentially controlling the activation of the small vertical lines so that only the small vertical lines pertaining to a single primary color are activated during each scanning line, the colors being changed during the blanking intervals of the conventional black and white scanning process, whereby the color control is automatically synchronized with the scanning process.

16. A color reproducer to be used in a receiver for natural color television compatible with black and white television according to claim 15, comprising in combination: a cathode ray picture tube provided with a receiving screen in conformity with the aforesaid claim and provided with only one electron gun conventionally operated by the line color sequence inherent to the two tricolor processes, electronic means to horizontally deflect the electron beam before scanning each line so as to change the incidence direction of the beam in accordance with the color which is to be activated during the corresponding scanning line, and means focusing the electron beam independently from said initial deflections controlling the activation of the single primary colors.

17. A color reproducer to be used in a receiver for natural color television compatible with black and white television according to claim 15, comprising in combination; a cathode ray picture tube provided with a receiving screen in conformity with the aforesaid claim and provided with two electron guns horizontally arranged side by side which are alternately operating with the frame frequency and each one activates primary colors opposite to those activated by the other, electronic means to horizontally deflect the electron beam before scanning each line so as to change the incidence direction of the beam with the color which is to be activated during the corresponding scanning line, and means focusing the electron beam independently from the initial deflections controlling the activation of the single primary colors, operating both the guns with the same signals black and white are obtained in each line.

18. A receiver for natural color television compatible with black and white television according to claim 14, comprising a color reproducer provided with a receiving screen wherein the luminescent means inherent to the six primary colors are arranged in small dots horizontally aligned, the number of the horizontal alignments including dots inherent to the six primary colors being at least two times the number of the scanning lines so that in each minimum resolvable picture element are included at least six dots corresponding to two horizontal alignments of three dots, means activating a single primary color during the scanning of a single line, the colors being changed during the intervals between any two scanning lines in conformity with the color sequence inherent to the tricolor processes alternated with the frame frequency.

19. A color reproducer to be used in a receiver for natural color television compatible with black and white television according to claim 18, comprising in combination: a cathode ray picture tube provided with a receiving screen in conformity with the aforesaid claim and provided with one electron gun conventionally operated by the line-sequential color signal derived from the two tricolor processes, electronic means deflecting the electron beam horizontally and vertically before scanning each picture line so as to change the incidence direction of the beam in accordance with the color to be activated during each scanning line, the activation of the small dots inherent to the six primary colors being geometrically corresponding to six different incidence directions of the beam on the receiving screen, and means focusing the beam independently from said deflections.

20. A color reproducer to be used in a receiver for natural color television compatible with black and white television according to claim 18, comprising in combination: a cathode ray picture tube provided with a receiving screen in conformity with the aforesaid claim and provided with two electron guns alongside arranged one superposed to the other which are alternately operating with the frame frequency and each one activates primary colors opposite to those activated by the other, electronic means to horizontally deflect the electron beam before scanning each picture line so as to change the incidence direction of the beam in accordance with the color to be activated during each scanning line, the activation of the small dots inherent to the six primary colors being geometrically corresponding to the six different incidence directions of the beam on the receiving screen which are obtained by the three horizontal deflections of the beam pertaining to each one of the two guns, and means focusing the electron beam on the receiving screen independently from said deflections, the two guns operated by the same signals in the same line producing black and white.

21. A receiving screen to be used in a natural color television receiver compatible with black and white television according to claim 18, wherein each minimum resolvable picture element includes at least six dots corresponding to six primary colors horizontally aligned, at least two horizontal alignments being included in each scanning line, in the direction practically vertical all the dots being arranged in parallel alignments each one consisting of two opposite primary colors alternate with each dot.

22. A television system for obtaining still and animated images with all natural colors faithfully represented using only electronic means and in such a way that it may be fully compatible with the standard black and white television, wherein are combined optical and electronic means comprising a conventional tricolor camera together with signal processing devices and corresponding matrixing means effecting a complete colorimetric analysis of the scene to be televised so as to provide simultaneously in each minimum picture element corresponding to the highest frequency of the transmission band as in black and white television the electrical signals representing the colorimetric components of the primary colors inherent to two tricolor processes each one having its three primary colors opposite to those of the other and each one colorimetrically self-sufficient to reproduce faithfully all natural colors including white, said two groups of signals being used with proportioned intensity so that the signals of each couple of opposite primary colors effect a colorimetrically complete bicolor process, a combination of electronic switching means excluding all said simultaneous signals except those inherent to only one primary color during each scanning line, conventionally commutating the color with the scanning line frequency and arranging the signals in a line-sequential color transmission which is transmitted as in black and white common television system, a receiver set with electronic means for conventionally receiving the color sequence, said color sequence having been arranged commutating in the same order the three primary colors of a tricolor process and the corresponding opposite primary colors of the other tricolor process whereby using in the receiver equally color commutative switching means two opposite primary colors are activated in each minimum picture element during two consecutive frames, a single bicolor process being effected along each scanning line, from each bicolor process approximate color reproduction and black and white being obtained in each minimum resolvable picture element having the same extension as in black and white television, the three approximations compensating each other in the areas including all three bicolor processes, a color reproducer utilizing the alternate bicolor processes by conventionally interlaced fields and conventional scanning process and inherent synchronizing means, and a receiving screen in which the bicolor process effected along each scanning line corresponds to an additive optical synthesis of colored lights line-sequentially emitted by luminescent materials included in all minimum resolvable picture elements of the scanned line, said colored light emission inherent to the two opposite primary colors being alternately effected and automatically controlled by the frame frequency corresponding to common black and white television.

References Cited in the file of this patent

UNITED STATES PATENTS

| | | |
|---|---|---|
| 2,669,675 | Lawrence | Feb. 16, 1954 |
| 2,701,275 | Hulst | Feb. 1, 1955 |
| 2,755,334 | Banning | July 17, 1956 |
| 2,790,845 | Raibourn | Apr. 30, 1957 |

FOREIGN PATENTS

| | | |
|---|---|---|
| 777,969 | Great Britain | July 3, 1957 |